United States Patent
Yabuki et al.

(10) Patent No.: US 11,198,058 B2
(45) Date of Patent: Dec. 14, 2021

(54) STORAGE MEDIUM STORING GAME PROGRAM, INFORMATION PROCESSING APPARATUS, INFORMATION PROCESSING SYSTEM, AND GAME PROCESSING METHOD

(71) Applicant: NINTENDO CO., LTD., Kyoto (JP)

(72) Inventors: Kosuke Yabuki, Kyoto (JP); Takeshi Miyamoto, Kyoto (JP); Shigeto Murata, Tokyo (JP); Shinya Nakano, Tokyo (JP)

(73) Assignee: NINTENDO CO., LTD., Kyoto (JP)

( * ) Notice: Subject to any disclaimer, the term of this patent is extended or adjusted under 35 U.S.C. 154(b) by 157 days.

(21) Appl. No.: 16/686,688

(22) Filed: Nov. 18, 2019

(65) Prior Publication Data
US 2020/0078668 A1     Mar. 12, 2020

Related U.S. Application Data

(63) Continuation of application No. PCT/JP2017/019055, filed on May 22, 2017.

(51) Int. Cl.
*A63F 13/2145* (2014.01)
*G06F 3/0488* (2013.01)

(52) U.S. Cl.
CPC ...... *A63F 13/2145* (2014.09); *G06F 3/04886* (2013.01)

(58) Field of Classification Search
CPC .......................... A63F 13/2145; G06F 3/04886
See application file for complete search history.

(56) References Cited

U.S. PATENT DOCUMENTS

| | | |
|---|---|---|
| 7,309,287 B2 | 12/2007 | Miyamoto |
| 7,578,742 B2 | 8/2009 | Miyamoto |

(Continued)

FOREIGN PATENT DOCUMENTS

| | | |
|---|---|---|
| CN | 105872664 A | 8/2016 |
| EP | 1 852 163 A2 | 11/2007 |

(Continued)

OTHER PUBLICATIONS

U.S. Appl. No. 16/686,688, filed Nov. 18, 2019, Storage Medium Storing Game Program, Information Processing Apparatus, Information Processing System, and Game Processing Method.

(Continued)

*Primary Examiner* — Reginald A Renwick
(74) *Attorney, Agent, or Firm* — Nixon & Vanderhye P.C.

(57) ABSTRACT

An example of an information processing apparatus repeatedly acquires input positions detected by a pointing device. The information processing apparatus sets a reference position, based on an input position at which an input to the pointing device is started. The information processing apparatus executes a first movement process of causing a first object to move in a virtual game space, based on the reference position, and an input position of an input which is continuously performed from start of the input to the pointing device. The information processing apparatus executes a first process on a second object which is the same as or different from the first object, in a case where the input position of the input, which is continuously performed from start of the input to the pointing device, satisfies a predetermined condition regarding the relationship between the input position and the reference position.

14 Claims, 16 Drawing Sheets

(56) References Cited

U.S. PATENT DOCUMENTS

| | | |
|---|---|---|
| 8,172,681 B2 | 5/2012 | Kando |
| 8,197,342 B2 | 6/2012 | Kijima |
| 8,608,561 B2 | 12/2013 | Yamada |
| 9,649,563 B2 | 5/2017 | Lee |
| 10,335,678 B2 | 7/2019 | Takahashi |
| 10,585,531 B2 | 3/2020 | Ikeda |
| 2006/0019752 A1 | 1/2006 | Ohta |
| 2006/0052166 A1 | 3/2006 | Ohta |
| 2006/0109259 A1 | 5/2006 | Ohta |
| 2006/0128468 A1 | 6/2006 | Yoshikawa |
| 2007/0075985 A1 | 4/2007 | Niida |
| 2009/0143141 A1 | 6/2009 | Wells |
| 2012/0302338 A1 | 11/2012 | Shikata |
| 2012/0302345 A1 | 11/2012 | Shikata |
| 2012/0306775 A1* | 12/2012 | Miyachi .............. G06F 3/03545 345/173 |
| 2013/0084980 A1 | 4/2013 | Hammontree et al. |
| 2013/0154974 A1 | 6/2013 | Murata |
| 2013/0190085 A1* | 7/2013 | Yoshikawa ........... A63F 13/426 463/31 |
| 2014/0256439 A1 | 9/2014 | Wang et al. |
| 2014/0340329 A1 | 11/2014 | Chen |
| 2015/0094127 A1 | 4/2015 | Canose et al. |
| 2015/0157932 A1 | 6/2015 | Kwon |

FOREIGN PATENT DOCUMENTS

| | | |
|---|---|---|
| EP | 2 422 854 A2 | 2/2012 |
| JP | H11-95650 | 4/1999 |
| JP | 2002-000939 | 1/2002 |
| JP | 3734819 | 10/2005 |
| JP | 3734820 | 10/2005 |
| JP | 2012-252587 | 12/2012 |
| JP | 2013-127683 | 6/2013 |
| JP | 2016-120131 | 7/2016 |
| JP | 2016-134052 | 7/2016 |
| JP | 6097427 | 3/2017 |
| KR | 10-2011-0119227 | 11/2011 |

OTHER PUBLICATIONS

U.S. Appl. No. 16/688,156, filed Nov. 19, 2019, Storage Medium Storing Game Program, Information Processing Apparatus, Information Processing System, and Game Processing Method.

U.S. Appl. No. 16/689,496, filed Nov. 20, 2019, Storage Medium Storing Game Program, Information Processing Apparatus, Information Processing System, and Game Processing Method.

International Search Report issued in PCT/JP2017/019055 dated Aug. 1, 2017 (4 pages).

Extended European Search Report dated Oct. 5, 2020 issued in European Application No. 17910718.0 (11 pgs.).

U.S. Appl. No. 16/688,156 to Yabuki, et al., filed Nov. 19, 2019 (75 pages).

U.S. Appl. No. 16/689,496 to Yabuki, et al., filed Nov. 20, 2019 (77 pages).

Toshiaki Yasuda, "E3 2012, GREE Shutten Booth Report 'Metal Slug', 'Biohazard' Nado Shinsaku Title o Ikkyo ni Taiken", 'Wacky Mortors', [online], Jun. 8, 2012, Impress Corp., GAME Watch, [retrieval data Jul. 19, 2017], Internet URL:http://game.watch.impress.co.jp/docs/news/538861.html (6 pages).

Mario Kart DS Kanpeki Bakuso Guidebook, 1st edition, Enterbrain, Inc., Jan. 24, 2006, p. 26 (4 pages).

Extended European Search Report dated Dec. 20, 2019 issued in European Application No. 17905006.7 (10 pgs.).

Office Action dated Jan. 6, 2021 issued in U.S. Appl. No. 16/689,496 (10 pgs.).

Extended European Search Report dated Jan. 10, 2020 issued in European Application No. 17905004.2 (9 pgs.).

Notice of Reasons for Refusal dated Jul. 8, 2021 in corresponding Japanese Application No. 2019-519822, 5 pages.

* cited by examiner

Fig.5

| | OPERATION | OBJECT | PROCESSING |
|---|---|---|---|
| (a) | START OF TOUCH INPUT | NORMAL STATE | ·SETTING OF REFERENCE POSITION |
| (b) | MOVEMENT OPERATION IN NORMAL STATE | NORMAL STATE | ·MOVEMENT CONTROL IN NORMAL STATE |
| (c) | TRANSITION OPERATION TO DRIFT STATE | DRIFT STATE | ·TRANSITION TO DRIFT STATE<br>·RESETTING OF REFERENCE POSITION |
| (d) | MOVEMENT OPERATION IN DRIFT STATE | DRIFT STATE | ·MOVEMENT CONTROL IN DRIFT STATE |
| (e) | CONTINUATION OF MOVEMENT OPERATION | DRIFT STATE (ACCELERATION-ALLOWED STATE) | ·SETTING TO ACCELERATION-ALLOWED STATE |
| (f) | ACCELERATION OPERATION (END OF TOUCH INPUT) | NORMAL STATE (ACCELERATED STATE) | ·MOVEMENT CONTROL IN ACCELERATED STATE |

STORAGE MEDIUM STORING GAME PROGRAM, INFORMATION PROCESSING APPARATUS, INFORMATION PROCESSING SYSTEM, AND GAME PROCESSING METHOD

CROSS REFERENCE TO RELATED APPLICATION

The present application is a continuation application of International Patent Application PCT/JP2017/019055 filed on May 22, 2017 the entire contents of which is hereby incorporated herein by reference.

FIELD

The present technology relates to a storage medium storing a game program, a game apparatus, a game system, and a game processing method, which use a pointing device to perform an input.

BACKGROUND AND SUMMARY

Conventionally, a technique of performing game operations by using a pointing device such as a touch panel has been proposed. For example, a game operation of causing an object in a game space to move is performed by using a pointing device.

A user interface which enables a user to perform more various game operations by using a pointing device has been desired.

Therefore, the present application discloses a storage medium storing a game program, a game apparatus, a game system, and a game processing method, which enable a user to perform various game operations by using a pointing device.

(1)

An example of a storage medium described herein stores a game program which causes a computer of an information processing apparatus to execute an acquisition step, a reference position setting step, a first movement process step, and a first process execution step. In the acquisition step, the computer repeatedly acquires input positions detected by a pointing device. In the reference position setting step, the computer sets a reference position, based on an input position at which an input to the pointing device is started. In the first movement process step, the computer executes a first movement process of causing a first object to move in a virtual game space, based on the reference position and on the input position of the input which is continuously performed from start of the input to the pointing device. In the first process execution step, the computer executes a first process on a second object which is the same as or different from the first object, in a case where the input position of the input, which is continuously performed from start of the input to the pointing device, satisfies a first condition regarding a relationship between the input position and the reference position.

According to the configuration of above (1), a user can perform a movement operation on an object by an input which is continuously performed from start of the input to the pointing device, and furthermore, can execute the first process on the object by the continuing input. Thus, the user is allowed to execute various game operations by using the pointing device.

(2)

The game program may further cause the computer to execute a second movement process step. In the second movement process step, the computer executes a second movement process of causing the second object to move in the virtual game space, based on an input position of an input which is continuously performed from start of the input to the pointing device and which is performed after execution of the first process.

According to the configuration of above (2), the user can perform a movement operation on the second object even after performing an operation to execute the first process on the second object. Thus, operability of the movement operation on the object can be improved.

(3)

The second object may be the same as the first object. In the first process execution step, a process of changing the state of the first object may be executed as the first process.

According to the configuration of above (3), the user can perform both a movement operation on the object and an operation to change the state of the object, by a continuous input to the pointing device. Thus, the user is allowed to perform multiple types of operations by the continuous input to the pointing device, thereby enabling the user to perform more various game operations.

(4)

In the first process execution step, a process of changing a state regarding movement of the first object may be executed as the first process. The game program may further cause the computer to execute a third movement process step of executing a third movement process of causing the first object to move by a control method different from that for the first movement process, based on an input position of an input which is continuously performed from start of the input to the pointing device and which is performed after execution of the first process.

According to the configuration of above (4), the user can change, through the first process, the control method for movement by the movement operation. Therefore, according to the configuration of above (4), the user can perform, by a continuous input, both the movement operation on the object and the operation to change the control method for movement by the movement operation. Thus, the user is allowed to perform various movement operations by the simple input method.

(5)

In the first process execution step, when the state of the second object is changed in response to the first condition being satisfied, the changed state of the second object may be maintained after the first condition has become unsatisfied.

According to the configuration of above (5), once the first condition is satisfied, the state of the first object changed through the first process is maintained even after the first condition has become unsatisfied. That is, after the user performs an operation that satisfies the first condition, the user can perform the operation without being restricted by the first condition, whereby the user can perform another operation by an input to the pointing device. Thus, the degree of freedom of an operation performed by an input to the pointing device can be increased, thereby improving operability.

(6)

In the first process execution step, a process, which is different from the first movement process and is for controlling action of the second object, may be executed as the first process.

According to the configuration of above (6), the user can perform, by a continuous input to the pointing device, both a movement operation on the first object and an operation on the second object (which may be the same as or different from the first object). Thus, the user is allowed to perform multiple types of operations by a continuous input to the pointing device, thereby realizing more various game operations.

(7)

The game program may further cause the computer to execute a second process execution step. In the second process execution step, the computer executes a second process on the second object, the second process being different from the first process, in a case where an input, which is continuously performed from start of the input to the pointing device and which is performed after execution of the first process, satisfies a second condition.

According to the configuration of above (7), after the user causes the information processing apparatus to execute the first process by an operation that satisfies the first condition, the user can further cause the information processing apparatus to execute the second process by an operation that satisfies the second condition. Thus, the user is allowed to perform multiple types of operations by a continuous input to the pointing device, thereby enabling the user to perform more various game operations.

(8)

In the second process execution step, a process regarding movement of the second object may be executed as the second process.

According to the configuration of above (8), the user can perform an operation regarding movement of the first object even after causing the information processing apparatus to execute the first process by the operation that satisfies the first condition. Thus, the user is allowed to perform various operations regarding movement of the object by a simple input method.

(9)

In the second process execution step, the second process may be executed in response to end of the input which is continuously performed from start of the input to the pointing device.

According to the configuration of above (9), the user can cause the information processing apparatus to execute the second process by an operation to end the continuous input to the pointing device. Thus, the user is allowed to perform a game operation also by the operation to end the continuous input, in addition to the operation during the continuous input, thereby enabling the user to perform more various game operations.

(10)

The first condition may include a condition that a state, in which the input position of the input continuously performed from start of the input to the pointing device satisfies a predetermined condition, is continued for a predetermined time period.

According to the configuration of above (10), even if the input position satisfies the predetermined condition temporarily (i.e., for a time period shorter than the predetermined time period), this is not deemed that the first condition is satisfied. Therefore, it is possible to reduce a risk that the first process is performed against the user's intention as a result of the first condition being satisfied by an erroneous or unintended input by the user. Thus, operability of the operation caused by an input to the pointing device can be improved.

(11)

In the first process execution step, the first process may be executed in response to the first condition being satisfied after start of the first movement process.

According to the configuration of above (11), the user can perform an operation on the second object while performing the movement operation on the first object. That is, the user can perform the operation on the second object continuously to the operation on the first object. For example, when the first object is the same as the second object, the user can perform an operation different from the movement operation, on the first object being subjected to the movement operation, by an input which is continuously performed from input of the movement operation.

(12)

Another example of a storage medium described herein stores a game program which causes a computer of an information processing apparatus to execute an acquisition step, a reference position setting step, a movement process step, and a reference position resetting step. In the acquisition step, the computer repeatedly acquires input positions detected by a pointing device. In the reference position setting step, the computer sets a reference position, based on an input position at which an input to the pointing device is started. In the movement process step, the computer executes a movement process of causing an object to move in a virtual game space, based on the reference position and on the input position of the input which is continuously performed from start of the input to the pointing device. In the reference position resetting step, when the input position of the input, which is continuously performed from start of the input to the pointing device, satisfies a predetermined condition, the computer resets the reference position to the input position at which the condition is satisfied.

According to the configuration of above (12), both a movement operation on the object and an operation to reset the reference position can be performed by a continuous input to the pointing device. Thus, the user is allowed to perform various operations using the pointing device. Further, according to the configuration of above (12), since the user can reset the reference position while continuing the input, the user can reset the reference position by a simple operation without necessity of performing an input again. Thus, operability of the operation using the pointing device can be improved. Furthermore, since an input position at which the predetermined condition is satisfied becomes a new reference position, the information processing apparatus can set the reference position at a position that is intuitively recognized by the user.

(13)

The game program may further cause the computer to execute a determination step. In the determination step, the computer determines whether or not the input position of the input, which is continuously performed from start of the input to the pointing device, satisfies the predetermined condition. At this time, in the reference position resetting step, the reference position may be reset to the input position that is determined to satisfy the condition in the determination step.

According to the configuration of above (13), the reference position is reset to an input position at a time point when it is determined that a predetermined condition is satisfied. Thus, an input position at a time point when the predetermined condition is satisfied can be easily specified, whereby a new reference position can be set to the input position.

This specification discloses examples of an information processing apparatus and an information processing system which executes the processes in the steps in above (1) to (13) (not limited to the mode of executing the steps by a program). In addition, this specification discloses an example of a game processing method in which a computer executes the processes in the steps in above (1) to (13).

With the storage medium storing, the game apparatus, the game system, and the game processing method described above, a user is allowed to perform various game operations by using a pointing device.

These and other objects, features, aspects and advantages will become more apparent from the following detailed description when taken in conjunction with the accompanying drawings.

BRIEF DESCRIPTION OF THE DRAWINGS

FIG. 5 shows examples of game operations that can be performed by a touch input in the embodiment;

DETAILED DESCRIPTION OF NON-LIMITING EXAMPLE EMBODIMENTS

1. Overall Configuration of System

Figure 1:
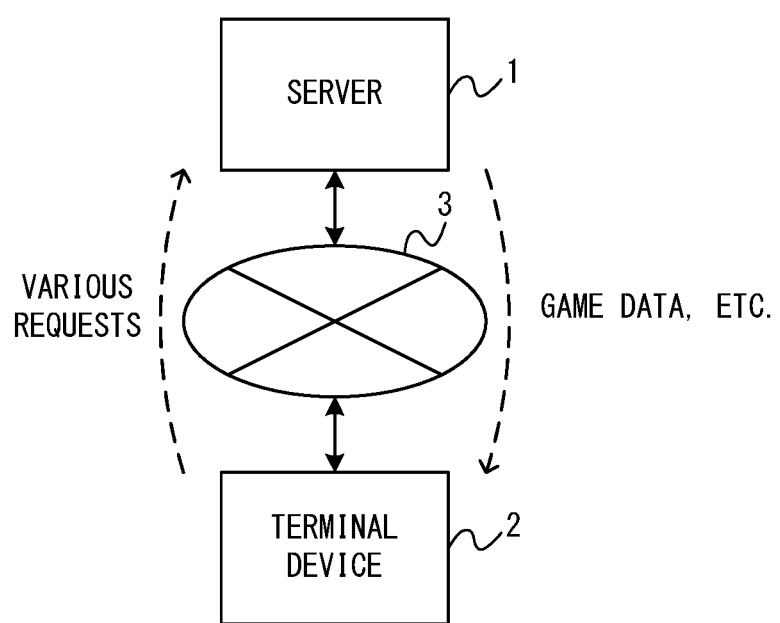
FIG. 1 is a block diagram showing an example of a configuration of a non-limiting information processing system according to an embodiment.

Hereinafter, an information processing system, an information processing apparatus, a game program, and a game processing method according to the present embodiment will be described. First, a description is given of the overall configuration of the information processing system according to the present embodiment, and the configurations of a terminal device and a server included in the information processing system. FIG. 1 is a block diagram showing an example of the configuration of the information processing system according to the present embodiment. As shown in FIG. 1, the information processing system includes a server 1 and a terminal device 2. The server 1 and the terminal device 2 are connectable to a network 3 such as the Internet and/or a mobile communication network. The server 1 and the terminal device 2 are communicable with each other via the network 3.

The server 1 is a server for providing services relating to applications to be executed in the terminal device 2. In the present embodiment, the server 1 is a game server for games to be executed in the terminal device 2. That is, the server 1 provides an environment for execution of game processing in the terminal device 2. For example, in response to a request from the terminal device 2 which executes game processing, the server 1 executes the game processing according to need, and transmits, to the terminal device 2, game data complying with the request.

The terminal device 2 is an example of an information processing apparatus possessed by a user. Examples of the terminal device 2 include: a smart phone, a hand-held or stationary game apparatus, a mobile phone, a tablet terminal, and a wearable terminal. The terminal device 2 can execute a game program (in other words, game application) for which the server 1 provides a service.

(Specific example of configuration of server 1)

Figure 2:
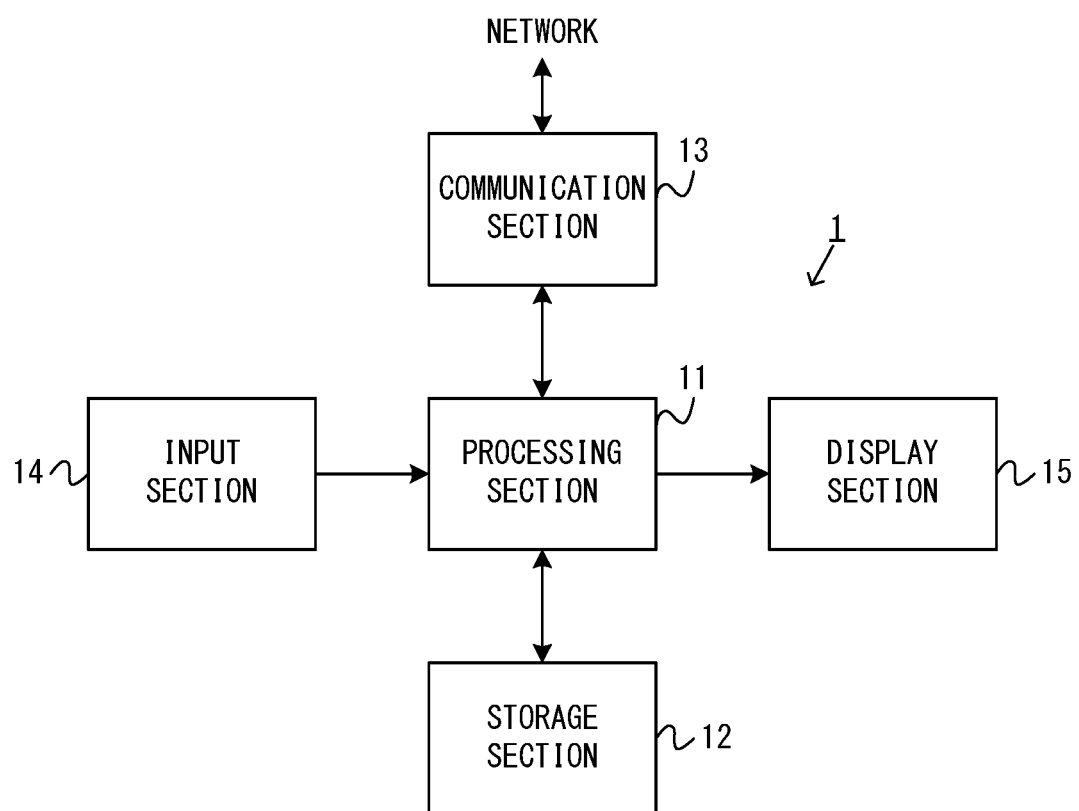
FIG. 2 is a block diagram showing an example of a configuration of a non-limiting server.

FIG. 2 is a block diagram showing an example of a configuration of the server 1. In FIG. 2, each of components of the server 1 is implemented by one or more information processing apparatuses. The hardware configuration of the server 1 of the present embodiment may be the same as that for a conventional server.

As shown in FIG. 2, the server 1 includes a processing section 11 and a storage section 12. The processing section 11 is electrically connected to the components 12 to 15 of the server 1. The processing section 11 includes a CPU (Central Processing Unit) and a memory. In the server 1, the CPU executes, using the memory, programs stored in the storage section 12, thereby executing various kinds of information processing. The storage section 12 is any storage device (also referred to as "storage medium") that is accessible by the processing section 11. The storage section 12 stores therein programs to be executed in the processing section 11, data to be used for information processing by the processing section 11, data obtained by the information processing, etc. In the present embodiment, the storage section 12 stores therein at least a program for game processing which is to be executed on the server side for game processing to be executed in the terminal device 2.

The server 1 includes a communication section 13. The communication section 13 is connected to the network 3, and has a function of communicating with other devices (e.g., the terminal device 2) via the network 3. The server 1 includes an input section 14 and a display section 15 as input/output interfaces.

(Specific Example of Configuration of Terminal Device 2)

Figure 3:
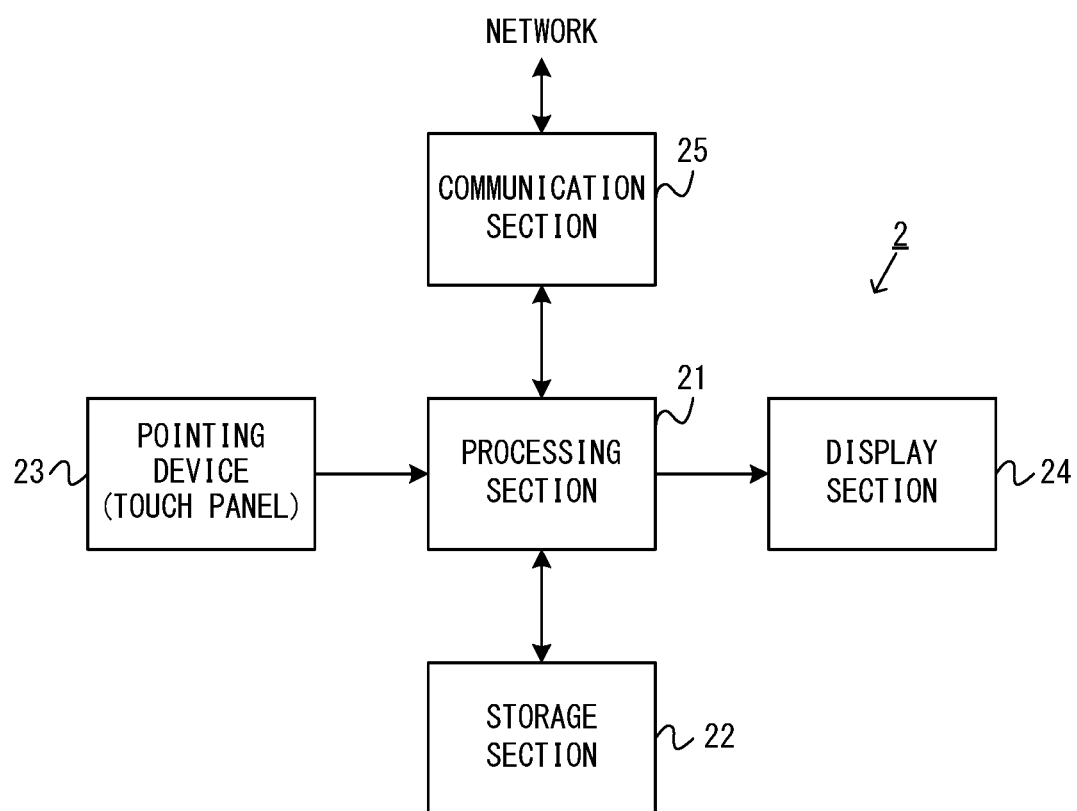
FIG. 3 is a block diagram showing an example of a configuration of a non-limiting terminal device.

FIG. 3 is a block diagram showing an example of a configuration of the terminal device 2. As shown in FIG. 3, the terminal device 2 includes a processing section 21 and a storage section 22. The processing section 21 is electrically connected to the components 22 to 25 of the terminal device 2. The processing section 21 includes a CPU and a memory. In the terminal device 2, the CPU executes, using the memory, programs (including the aforementioned game program) stored in the storage section 22, thereby executing various kinds of information processing. The storage section 22 stores therein programs to be executed in the processing section 21, data to be used for information processing by the processing section 21, and data obtained by the information processing, etc. The storage section 22 may be a storage medium (e.g., a card-type storage medium) that is attachable/detachable with respect to the terminal device 2.

The terminal device 2 includes a pointing device as an example of the input section. The pointing device is any input device having an input surface, and is capable of detecting a position designated on the input surface (by a user, for example). In the present embodiment, the pointing device is a touch panel 23 provided on a screen of a display section 24. The touch panel 23 detects a position designated by an input of touching (referred to as "touch input") on the input surface (in other words, a surface set on the screen of the display section 24).

The pointing device may be a touch type input device capable of detecting a position designated (by the user, for example) on an input surface, such as a touch screen, a touch panel, or a touch pad. The touch type input device may be an input device that allows contact or noncontact input to an input surface. That is, the touch type input device is not limited to a device capable of detecting a position of a touch input to the input surface, and may be an input device (e.g., an input device having a floating touch function) capable of detecting an input position by detecting a finger or the like disposed at a position a little distant from the input surface. That is, the touch type input device may detect a position designated by an input performed by disposing a finger or the like at a position a little distant from the input surface, instead of (or in addition to) a touch input performed on the input surface.

The pointing device is not limited to the touch type input device, and may be a mouse, or an operation apparatus that is moved by a user. The operation apparatus is able to designate a position on an input surface in accordance with the position and/or the direction of the operation device.

As in a touch panel, for example, when the input surface of the pointing device is set on the screen of the display section 24, an input position detected by the pointing device is, to be precise, a position corresponding to a position on the display screen. However, the input position substantially indicates a position on the display screen. Therefore, in the description of the present embodiment, for easy understanding, the input position is sometimes described as a position on the display screen. The wording "an input position is located at a specific position on the display screen" means, to be precise, that the input position is located at a position that is on the input surface and corresponds to a specific position on the display screen.

The terminal device 2 includes a display section 24. The display section 24 displays an image (e.g., a game image, etc.) generated by information processing executed in the processing section 21 of the terminal device 2.

The terminal device 2 includes a communication section 25. In the present embodiment, the communication section 25 has a function of performing communication while being connected to a mobile communication network (in other words, mobile telephone communication network). That is, the terminal device 2 (specifically, the processing section 21) is connected to the network 3 by using the communication section 25 (in other words, through the communication section 25) via the mobile communication network, and communicates with other devices (e.g., the server 1, etc.). The configuration of the communication section, through which the terminal device 2 performs communication via the network 3, is arbitrary. For example, the communication section 25 may have a function of connecting to a wireless LAN through a communication module with Wi-Fi authentication. Alternatively, the communication section 25 may have both a function of connecting to a mobile communication network and a function of connecting to a wireless LAN.

2. Outline of Processing in Information Processing System

Hereinafter, an outline of game processing executed in the information processing system will be described with reference to FIGS. 4 to 13. In the present embodiment, an exemplary case will be described, where game processing for a racing game in which a user (in other words, a player) operates an object representing a car (refer to FIG. 4) is executed in the information processing system.

In the present embodiment, the user performs an operation on the object by a touch input. That is, the terminal device 2 controls action of the object, based on a touch input to the touch panel 23.

[2-1. Action when No Touch Input is Performed]

Figure 4:
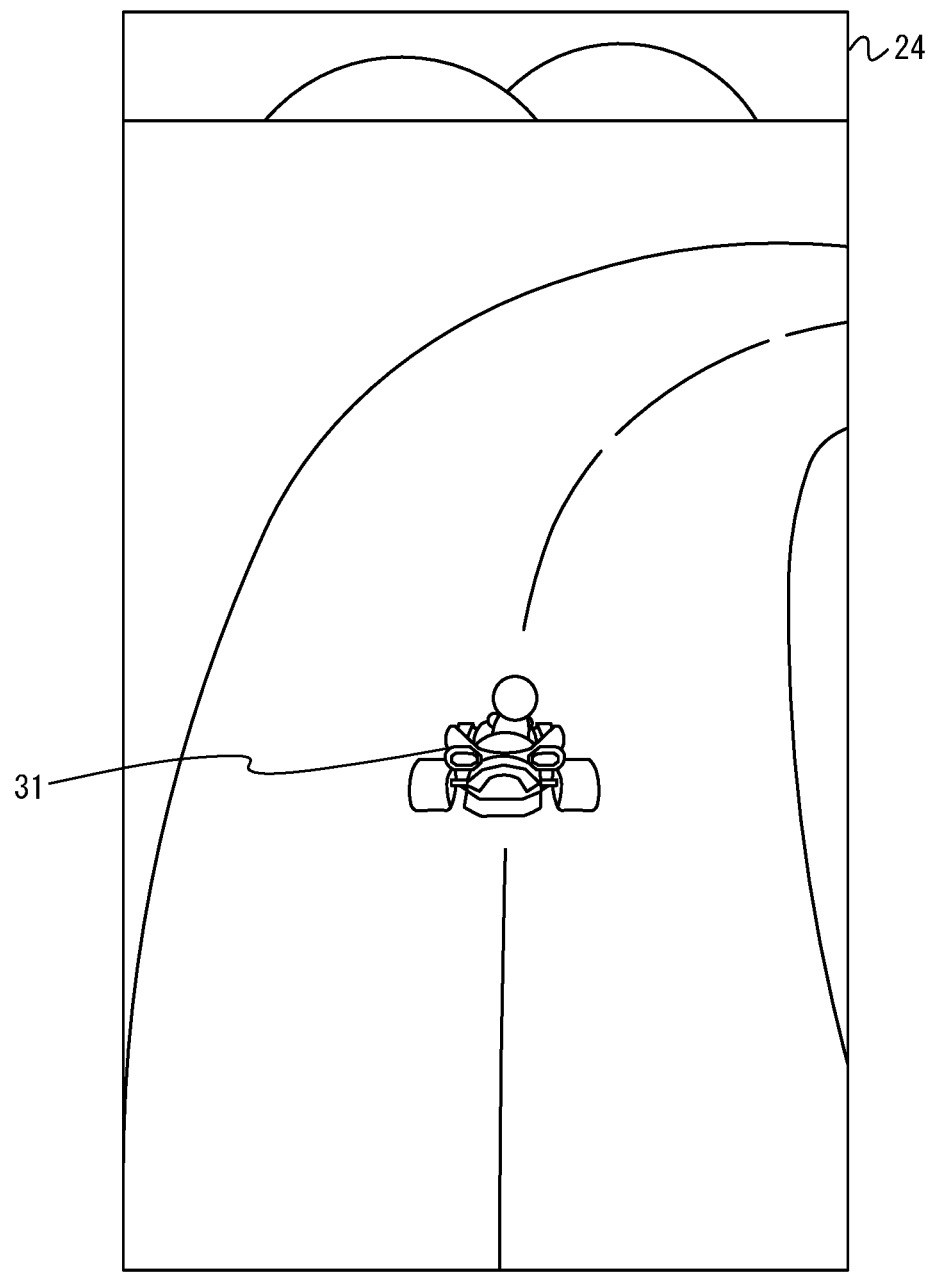
FIG. 4 shows an example of a game image.

First, an action in the case where no touch input is performed will be described. FIG. 4 shows an example of a game image. FIG. 4 shows a game image when no touch input is performed. As shown in FIG. 4, the terminal device 2 causes the display section 24 to display a game image including a virtual game space (in the present embodiment, a racing course), and an object 31 which appears in the game space. The object 31 is an object representing a car (and a character driving the car), and is operated by the user.

In the present embodiment, when no touch input is performed, the terminal device 2 controls movement of the object 31 automatically (i.e., according to a predetermined algorism). In this case, the object 31 is automatically controlled so as to advance along the racing course. In another embodiment, the terminal device 2 may control movement of the object 31 such that the object 31 advances straight, when no touch input is performed.

In the present embodiment, the speed of the object 31 is controlled automatically (e.g., at a fixed speed), except when an acceleration action described later is performed. In another embodiment, the speed of the object 31 may be controlled based on an input performed by the user. For example, the terminal device 2 may control the speed of the object 31, based on an instruction from the user (e.g., an instruction by a touch input to an accelerator button displayed on a screen).

In the present embodiment, the object 31 can take two types of states, i.e., a normal state and a drift state. Although details will be described later, the normal state and the drift state are different from each other in the content of a process of controlling movement of the object 31 based on a touch input by the user. In the present embodiment, the object 31 is in the normal state at least when no touch input is performed.

In the present embodiment, for the object 31 whose movement is automatically controlled when no touch input is performed, the user performs various game operations on the object 31 by a touch input. FIG. 5 shows examples of game operations that can be performed by a touch input in the present embodiment. As shown in FIG. 5, in the present embodiment, the user can cause the object 31 to move in a desired direction ((b) and (d) in FIG. 5), cause the object 31 to transition from the normal state to the drift state ((c) in FIG. 5); and cause the object 31 to accelerate ((f) in FIG. 5) by a touch input. Hereinafter, the outline of the action will be described for an exemplary case where the game operations shown in (a) to (f) in FIG. 5 are performed.

[2-2. Action Regarding Movement Operation from Start of Touch Input]

Figure 6:
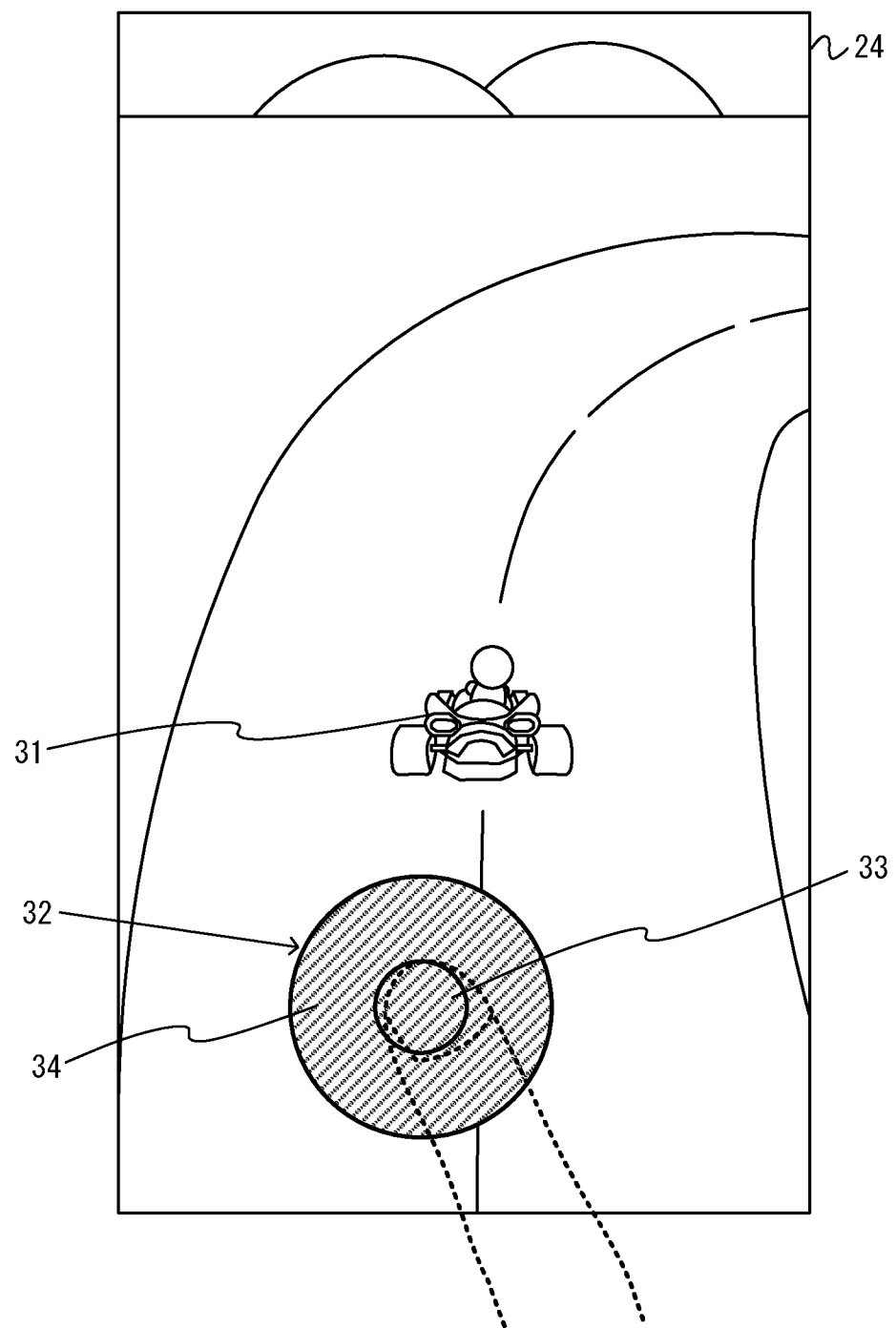
FIG. 6 shows an example of a game image when a touch input is started.

An action in the case where a touch input is started and a movement operation is performed by the touch input ((a) and (b) in FIG. 5) will be described with reference to FIGS. 6 to 8. FIG. 6 shows an example of a game image when a touch input is started.

In the present embodiment, when a touch input is started, the terminal device 2 first sets a reference position based on an input position at the time of a touch-on ((a) in FIG. 5). Although details will be described later, the reference position is a position used for specifying the content of an input instruction by the touch input. In the present embodiment, an input position at the time of a touch-on, i.e., an input position at start of a touch input, is set as a reference position. In this specification, "touch-on" means that a touch input is started. In other words, "touch-on" means a change from a state where no touch input is performed to a state where a touch input is performed. In this specification, end of a touch input, in other words, a change from a state where a touch input is performed to a state where no touch input is performed, is referred to as "touch-off".

In another embodiment, a reference position that is set at the time of a touch-on may be any position that is set based on an input position at the time of the touch-on. For example, when an input position at the time of a touch-on is located near an end of the screen of the display section 24, the terminal device 2 may set, as a reference position, a position at a predetermined distance from the end of the screen, based on the input position. In this case, the user can designate an input position that is by the predetermined distance away from the reference position in any direction. Alternatively, in the above case, a reference position may be set at a position within a distance of a radius r2 of a reference position image described later from the end of the screen. In another embodiment, a reference position that is set at the time of a touch-on may be fixedly set regardless of an input position at the time of the touch-on. That is, the terminal device 2 may set a predetermined position (e.g., a center position of the screen of the display section 24) as a reference position.

In the present embodiment, the user can start a touch input for a movement operation, with any position on the input surface of the touch panel 23 being an input start position. That is, in response to a touch input being started at any position on the input surface, the terminal device 2 executes a process of setting a reference position and a process of specifying an input instruction described later. However, in another embodiment, the terminal device 2 may execute these processes on condition that a touch input is started within a predetermined input reception area in the input surface. The input reception area may be, for example, an area that is set based on the position of the object 31, or a predetermined area.

As shown in FIG. 6, while a touch input to the touch panel 23 is performed, the terminal device 2 causes the display section 24 to display an operation image 32 in addition to a game image. In FIG. 6, a finger of the user who performs the touch input is represented by a dotted line. In the present embodiment, the operation image 32 includes an input position image 33 and a reference position image 34.

The input position image 33 is an image representing a position that is located on the input surface of the touch panel 23 and is the current input position. Specifically, the input position image 33 represents a circular region having a radius r1 around the input position (refer to FIG. 7). The reference position image 34 is an image representing a position that is located on the input surface of the touch panel 23 and is a reference position. Specifically, the reference position image 34 represents a circular region having a radius r2 (>r1) around the reference position (refer to FIG. 7).

As described above, in the present embodiment, since the operation image 32 is displayed, the user can visually recognize the input position and the reference position. This allows the user to easily perform an input according to his/her intention, and the terminal device 2 can improve operability for the touch input. As shown in FIG. 6, the operation image 32 of the present embodiment is an image representing a slide pad that is an example of a direction input device. However, in another embodiment, the operation image 32 may be any image representing a reference position and an input position. In still another embodiment, no operation image 32 may be displayed on the display section 24.

After starting the touch input, the user performs a movement operation on the object 31 by the touch input being continued, specifically, by a sliding operation ((b) in FIG. 5). That is, in the present embodiment, the user performs, by the touch input, an input instruction for instructing a movement direction of the object 31. Hereinafter, a method of performing an input instruction will be described with reference to FIG. 7.

Figure 7:
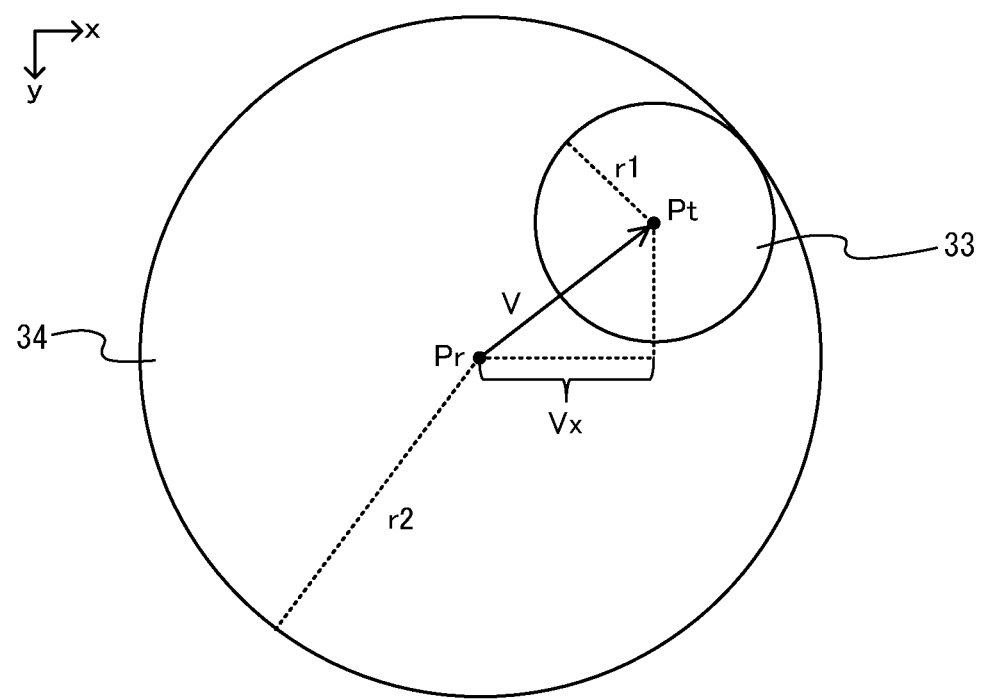
FIG. 7 shows an example of an operation image.

FIG. 7 shows an example of an operation image. In FIG. 7, a reference position and an input position are shown in addition to an operation image 32 displayed on the display section 24. In the present embodiment, the input position is acquired, from the touch panel 23, as two-dimensional coordinates indicating a position on the input surface. In addition, each of the input position and the reference position is stored as two-dimensional coordinates in the terminal device 2.

FIG. 7 shows a state where, after a touch-on, an input position Pt has been shifted from a position at the time of the touch-on (i.e., from a reference position Pr). An input instruction by a touch input is performed while the touch input is continued from the touch-on. Here, a touch input which is continuously performed from a touch-on (i.e., which is performed without interruption from a touch-on) is referred to as "continuous touch input". The terminal device 2 specifies the content of the input instruction based on the reference position and the input position, while the continuous touch input is being performed. In the present embodiment, as values representing the content of the input instruction, an input direction and an input distance are calculated.

The input direction is calculated based on a vector V from the reference position Pr to the input position Pt. The vector V is a vector having the reference position Pr as a start point, and the input position Pt as an end point. In the present embodiment, the input direction is calculated as a direction of an x-axis component of the vector V (in other words, a component in a transverse direction on the input surface). That is, in the present embodiment, the input direction is calculated as a rightward direction (i.e., x-axis positive direction) or a leftward direction (i.e., x-axis negative direction).

The input distance is calculated based on the magnitude of the vector V. In the present embodiment, the input distance is calculated as a magnitude Vx of the x-axis component of the vector V.

As described above, in the present embodiment, an input instruction corresponds to a direction and a magnitude regarding a one-dimensional direction (specifically, x-axis direction). Therefore, an input instruction may be represented as a numerical value, such as "−2" or "1", in which an input direction is represented as a positive or negative sign and an input distance is represented as an absolute value.

In another embodiment, an input instruction may be a direction and a magnitude regarding a two dimension. That is, an input instruction may have the direction of the vector V being an input direction, and the magnitude of the vector V being an input distance. In still another embodiment, an input instruction may include only one of an input direction and an input distance.

The terminal device 2 controls action (specifically, movement) of the object 31, based on the aforementioned input instruction. In other words, the object 31 is controlled based on the input position and the reference position. A specific control method for the object 31 is arbitrary. In the present embodiment, the terminal device 2 controls the object 31 such that the object 31 makes a turn by an amount of turn according to the input distance, in a direction according to the input direction. That is, the object 31 moves so as to make a longer turn to the right as the input position Pt is more distant from the reference position Pr in the rightward direction, and moves so as to make a longer turn to the left as the input position Pt is more distant from the reference position Pr in the leftward direction. The direction and amount of turn of the object 31 may be calculated based on a straight advance direction, or may be calculated based on an advance direction of the object 31 when the object 31 automatically travels (i.e., when no touch input is performed). Furthermore, as described above, in the present embodiment, the speed of the object 31 is automatically controlled except when an acceleration operation is performed.

As described above, in the present embodiment, the terminal device 2 controls movement of the object 31, based on an input distance that is a distance between a reference position and an input position continuously acquired after a touch-on, and on an input direction that is a direction from the reference position to the input position. According to this control, the user can perform an operation on an object by a simple operation method which is a touch input continued from a touch-on (i.e., continuous touch input). In another embodiment, movement of the object 31 may be controlled based on at least one of the input distance and the input direction.

The terminal device 2 may start control for the object 31 on condition that an input distance exceeds a predetermined control start distance. At this time, control for the object 31 is not performed during a time period from when an input is started to when an input position is adequately away from a reference position. Thus, it is possible to reduce a risk that movement control for the object 31 is performed against the user's intention when, for example, the user accidentally performs a touch input without intending to perform a movement operation (more specifically, for example, when a finger of the user hits the input surface of the touch panel 23).

(Reference Position Changing Process)

In the present embodiment, a reference position set at the time of a touch-on may be changed while a touch input continued from the touch-on is being performed. Hereinafter, a reference position changing process will be described.

Figure 8:
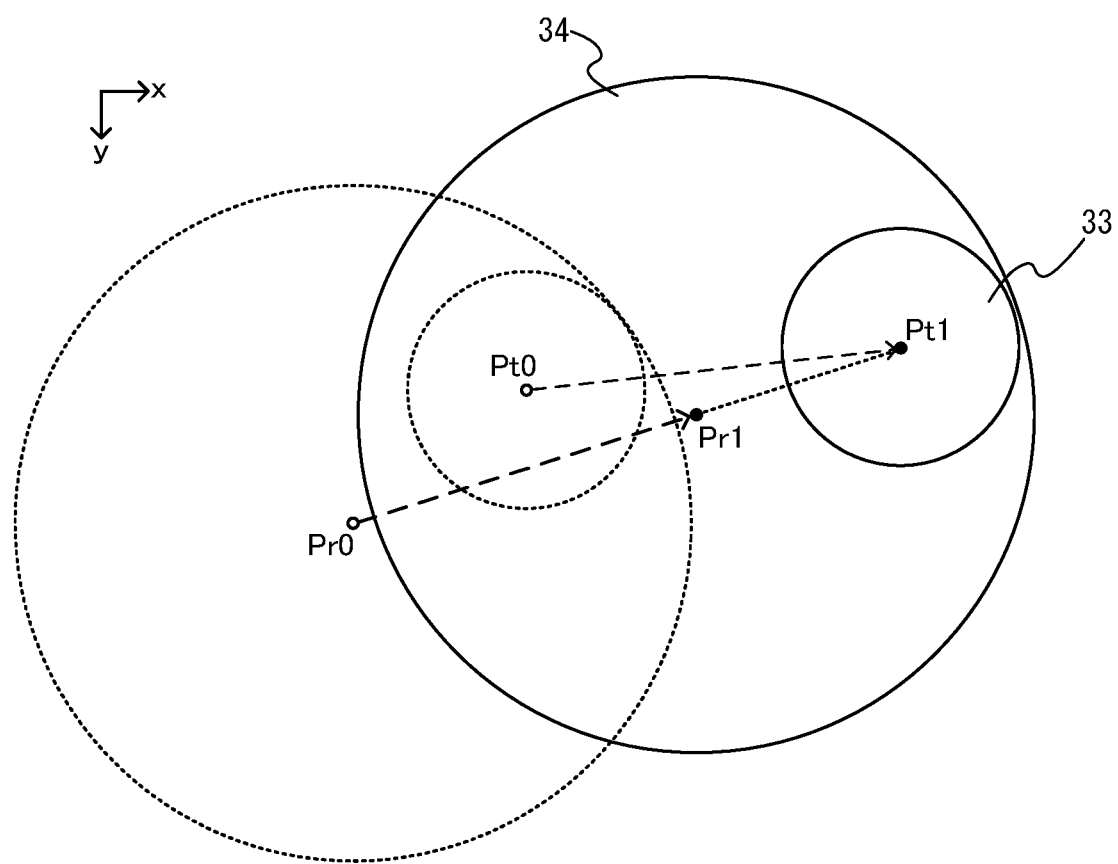
FIG. 8 shows an example of a state in which a reference position is changed.

FIG. 8 shows an example of a state in which a reference position is changed. In FIG. 8, a position Pr0 is a reference position at a certain time point t=0 during a continuous touch input, and a position Pt0 is an input position detected at the time point t=0. In the example of FIG. 8, an input position Pt1 is detected at a time point t=1 which is an input position detection time point subsequent to the time point t=0. In the present embodiment, the reference position is changed from the position Pr0 to a position Pr1 in response to the input position Pt1 being detected (refer to FIG. 8).

Specifically, when the distance from the reference position to the input position exceeds a predetermined distance as a result of shifting of the input position due to the continuous touch input, the terminal device 2 changes the reference position. The predetermined distance has a value determined in advance. For example, the predetermined distance has a value obtained by subtracting the radius r1 of the input position image from the radius r2 of the reference position image 34. Therefore, in the present embodiment, the reference position is set (in other words, changed) such that the input position image 33 is included in the reference position image 34. That is, the input position image 33 is disposed so as to be included in the circular region of the reference position image 34. In another embodiment, the reference position may be set such that the input position (i.e., the center of the input position image 33) is included in the reference position image 34. At this time, the aforementioned predetermined distance is set to the radius r2 of the reference position image 34. In another embodiment, the predetermined distance may be set to a value independent of the radius r1 of the input position image 33 and the radius r2 of the reference position image 34. That is, the sizes of the input position image 33 and the reference position image 34 may not be used for the reference position changing process.

As described above, the terminal device 2 changes the reference position such that the distance from the reference position to the input position is within the aforementioned predetermined distance. In the present embodiment, a post-change reference position Pr1 is determined to be a position on a line segment connecting a pre-change reference position Pr0 and the current input position Pt1, and the distance from the post-change reference position Pr1 to the current input position Pt1 is equal to the aforementioned predetermined distance (refer to FIG. 8).

A specific method for calculating a post-change reference position is arbitrary. For example, in another embodiment, the terminal device 2 may calculate a post-change reference position Pr1 such that the pre-change reference position Pr0 is shifted in a direction according the direction from the pre-change input position Pt0 of the reference position, to the current input position Pt1.

In the case where the reference position is changed as described above, the terminal device 2 calculates an input instruction (an input direction and an input distance) to be used for movement control of the object 31, based on the post-change reference position. The process of controlling the object 31 based on the input instruction is the same before and after the change of the reference position.

As described above, in the present embodiment, the terminal device 2 changes the reference position such that the reference position follows movement of the input position under certain conditions. Thus, the distance between the input position and the reference position is maintained within the aforementioned predetermined distance, which allows the user to easily perform an operation to move the current input position to the opposite side with respect to the reference position. For example, the user can easily change the input position on the right side with respect to the reference position, to a position on the left side with respect to the reference position. That is, the user can easily change an input instruction instructing the rightward direction to an input instruction instructing the leftward direction.

In another embodiment, the terminal device 2 may not execute the process of changing the reference position. That is, even when the distance from the input position to the reference position exceeds the aforementioned predetermined distance, the reference position may not be changed. At this time, the terminal device 2 may restrict the magnitude of the input distance (i.e., may set a maximum value of the input distance). For example, when the distance between the input position to the reference position exceeds the predetermined distance, the terminal device 2 may adopt the input distance as the predetermined distance.

[2-3. Transition Operation to Drift State]

In the present embodiment, immediately after a touch input is started, the object 31 is in the normal state. The object 31 transitions to the drift state when the user performs a predetermined transition operation during the continuous touch input ((c) in FIG. 5). That is, in the present embodiment, when the input position due to the continuous touch input satisfies a drift condition during the continuous touch input, the terminal device 2 causes the object 31 to transition from the normal state to the drift state. Thus, while the user is operating the object 31 in the normal state by the continuous touch input, the user can cause the object 31 to transition to the drift state by the continuous touch input. Hereinafter, the process of causing the object 31 to transition from the normal state to the drift state will be described with reference to FIG. 9.

Figure 9:
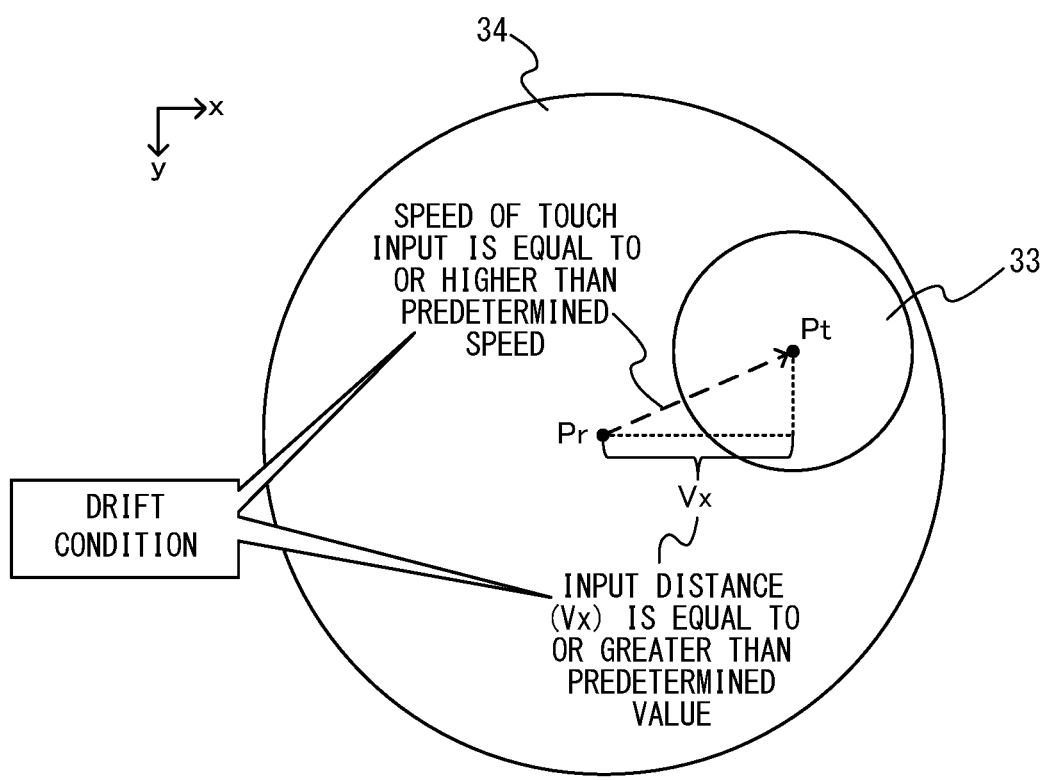
FIG. 9 shows an example of a drift condition determination method.

FIG. 9 shows an example of a drift condition determination method. In the present embodiment, the terminal device 2 determines whether or not an input position satisfies a drift condition while, after a touch-on, the object 31 is in the normal state and a continuous touch input is being performed. The terminal device 2 performs this determination each time an input position is detected.

In the present embodiment, the drift condition is a condition regarding the relationship between the input position Pt and the reference position Pr. Specifically, as shown in FIG. 9, the drift condition includes: (condition a) "a speed of a touch input is equal to or higher than a predetermined speed"; and (condition b) "a state, in which an input distance based on the current input position is equal to or greater than a predetermined value, continues for a predetermined first time period".

The "speed of a touch input" in the above (condition a) is a speed regarding a touch input continuously performed from a touch-on, in other words, a movement speed of an input position. The "speed of a touch input" may be any index representing a movement speed of the input position Pt during a time period in which the touch input is continued. For example, the terminal device 2 may calculate a speed of a touch input by dividing a distance from an input position at the time of a touch-on (i.e., the reference position Pr) to the current input position Pt, by a time period from the touch-on to the current time. Alternatively, for example, the terminal device 2 may calculate, regarding a continuous touch input, a movement speed of the input position Pt per unit time (i.e., a speed obtained by dividing a distance from a certain input position to a next input position by the unit time), and further calculate a maximum value or an average value of the movement speed, as a speed of a touch input. The terminal device 2 calculates the speed of the touch input based on the input position Pt, and determines whether or not the speed of the touch input is equal to or higher than a predetermined speed, thereby determining whether or not (condition a) is satisfied.

The input distance in the above (condition b) is a distance regarding a direction component (x-axis component in the present embodiment) corresponding to an input direction, that is, the magnitude of the x component of the vector V (refer to FIG. 9). However, in another embodiment, the magnitude of the vector V may be used instead of the input distance. The terminal device 2 calculates an input distance based on the input position Pt, and determines whether or not the input distance is equal to or greater than a predetermined value. Then, the terminal device 2 determines whether or not a state, in which the input distance is equal to or greater than the predetermined value, continues for the first time period, thereby determining whether or not (condition b) is satisfied.

When both (condition a) and (condition b) are satisfied, the terminal device 2 determines that the drift condition is satisfied. When the drift condition is satisfied, the terminal device 2 causes the object 31 to transition from the normal state to the drift state.

The drift condition may be any condition regarding a reference position and an input position. In another embodiment, the drift condition may be a condition that either (condition a) or (condition b) is satisfied. Furthermore, (condition b) may be a condition that the input distance becomes equal to or greater than the predetermined value (which means that continuation of this state is not required). The drift condition may include another condition instead of or in addition to (condition a) and (condition b). For example, the drift condition may include a condition regarding a direction from a reference position to an input position. Specifically, the drift condition may include a condition that the direction from the reference position to the input position is changed by a predetermined angle or more. As described above, the drift condition may be a condition regarding an input direction and/or an input distance.

As described above, in the present embodiment, the drift condition includes a condition that a state, in which an input position of a continuous touch input satisfies the predetermined condition, continues for the predetermined time period (i.e., (condition b)). Thus, it is possible to reduce a risk that the drift condition is satisfied against the user's intention during the continuous touch input. That is, since it is possible to reduce a risk that processing unintended by the user is executed, operability of the operation by a touch input can be improved.

In the present embodiment, the terminal device 2 controls the direction of the object 31 at start of the drift state, in accordance with the direction between the input position and the reference position in the case where the drift condition is satisfied. That is, in the present embodiment, the object 31 can take, as drift states, a leftward drift state (i.e., a drift state in which the object 31 turns to the left), and a rightward drift state (i.e., a drift state in which the object 31 turns to the right). When the input position, with the drift condition being satisfied, is on the left side with respect to the reference position, the object 31 is controlled to the leftward drift state. When the input position, with the drift condition being satisfied, is on the right side with respect to the reference position, the object 31 is controlled to the rightward drift state.

As described above, in the present embodiment, the object 31 can be caused to transition to the drift state by the touch input which continues from the touch input performed while the object 31 is in the normal state ((b) and (c) in FIG. 5). That is, the user can perform the transition operation to cause the object 31 to transition to the drift state while continuing the touch input from when the user has started the movement operation to move the object 31 in the normal state. Thus, in the present embodiment, the transition operation can be performed by the continuous touch input from when the movement operation is started. Therefore, the user can perform various operations by the continuous touch input. In addition, operabilities of the movement operation and the transition operation can be improved.

As described above, in the present embodiment, the transition operation for causing the object 31 to transition to the drift state is performed by an operation of the same type as the movement operation for causing the object 31 to move (i.e., the operation based on the relationship between an reference position and an input position). For example, the user continues, for the first time period, a movement operation to cause the object 31 to make a long turn to the right (i.e., an operation of locating an input position at a position that is away from the reference position by the predetermined value or more in the rightward direction), whereby the object 31 can be caused to transition to the drift state. As described above, in the present embodiment, the user can perform the transition operation naturally during the movement operation. In addition, continuity between the movement operation and the transition operation can be maintained. Thus, operability for the object 31 can be improved.

In another embodiment, the drift condition may be a condition that is not related to a reference position. For example, the drift condition may include a condition that "a continuous touch input represents a predetermined gesture (i.e., trajectory of the continuous touch input has a predetermined shape)". Alternatively, the drift condition may include a condition that "a predetermined operation (e.g., a flick operation, specifically, an operation in which a touch-off is performed after an input position is shifted at a predetermined speed or more) is performed by a continuous touch input".

In the present embodiment, if the state of the object 31 is changed in response to the drift condition being satisfied, the terminal device 2 maintains the changed state (i.e., the drift state) even after the drift condition has become unsatisfied. That is, after the input position of the continuous touch input has satisfied the drift condition, the terminal device 2 maintains the object 31 in the drift state even when the input position of the continuous touch input does not satisfy the drift condition anymore. Thus, the user need not maintain the transition operation in order to maintain the object 31 in the drift state, and can perform another operation after performing the transition operation. Thus, the terminal device 2 allows the user to perform more various operations by a continuous touch input. For example, in the present embodiment, the user can perform, after the transition operation, a movement operation on the object 31 in the drift state, as the aforementioned other operation ((d) in FIG. 5).

After the drift condition has become unsatisfied, the terminal device 2 may cause the object 31 to transition from the drift state to another state (e.g., the normal state) in response to a predetermined condition being satisfied. Although details will be described later, in the present embodiment, the object 31 is caused to transition from the drift state to the normal state when the touch input is ended.

(Resetting of Reference Position)

Figure 10:
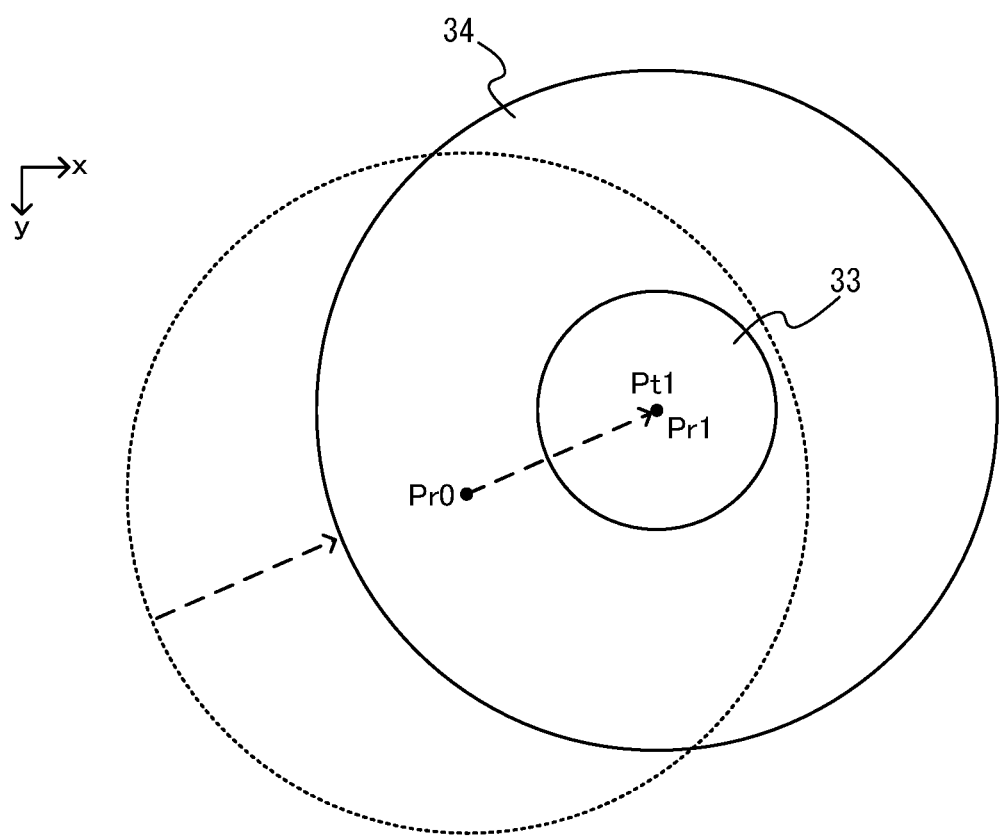
FIG. 10 shows an example of a state in which a reference position is reset.

In the present embodiment, when the drift condition is satisfied, the terminal device 2 resets the reference position ((c) in FIG. 5). FIG. 10 shows an example of a state in which the reference position is reset. In FIG. 10, a position Pr0 is a reference position at a certain time point t=0 before the drift condition is satisfied, and a position Pt1 is an input position detected at a time point t=1 when the drift condition is satisfied. In the example of FIG. 10, a reference position Pr1 is reset to the input position Pt1 at the time point t=1 when the drift condition is satisfied (refer to an arrow shown in FIG. 10).

As described above, the reference position is reset (also referred to as "changed") such that the input position at the time point when the object 31 transitions to the drift state (i.e., the input position that satisfies the drift condition) becomes a new reference position. In the present embodiment, the terminal device 2 receives an input instruction for controlling the movement direction of the object 31, also in the drift state as in the normal state. Therefore, by resetting the reference position at the time point when the object 31 transitions to the drift state, the user can perform an input instruction with the input position at that time point being a reference position, whereby the user can more easily perform the input instruction in the drift state. Thus, operability of the input instruction in the drift state can be improved.

[2-4. Movement Operation in Drift State]

In the present embodiment, even after the object 31 transitions to the drift state, the user can perform a movement operation ((d) in FIG. 5). That is, the user can operate the object 31 even in the drift state by the touch input which continues from the touch input performed while the object 31 is in the normal state. Hereinafter, an action of an object in the drift state will be described with reference to FIGS. 11 and 12.

Figure 11:
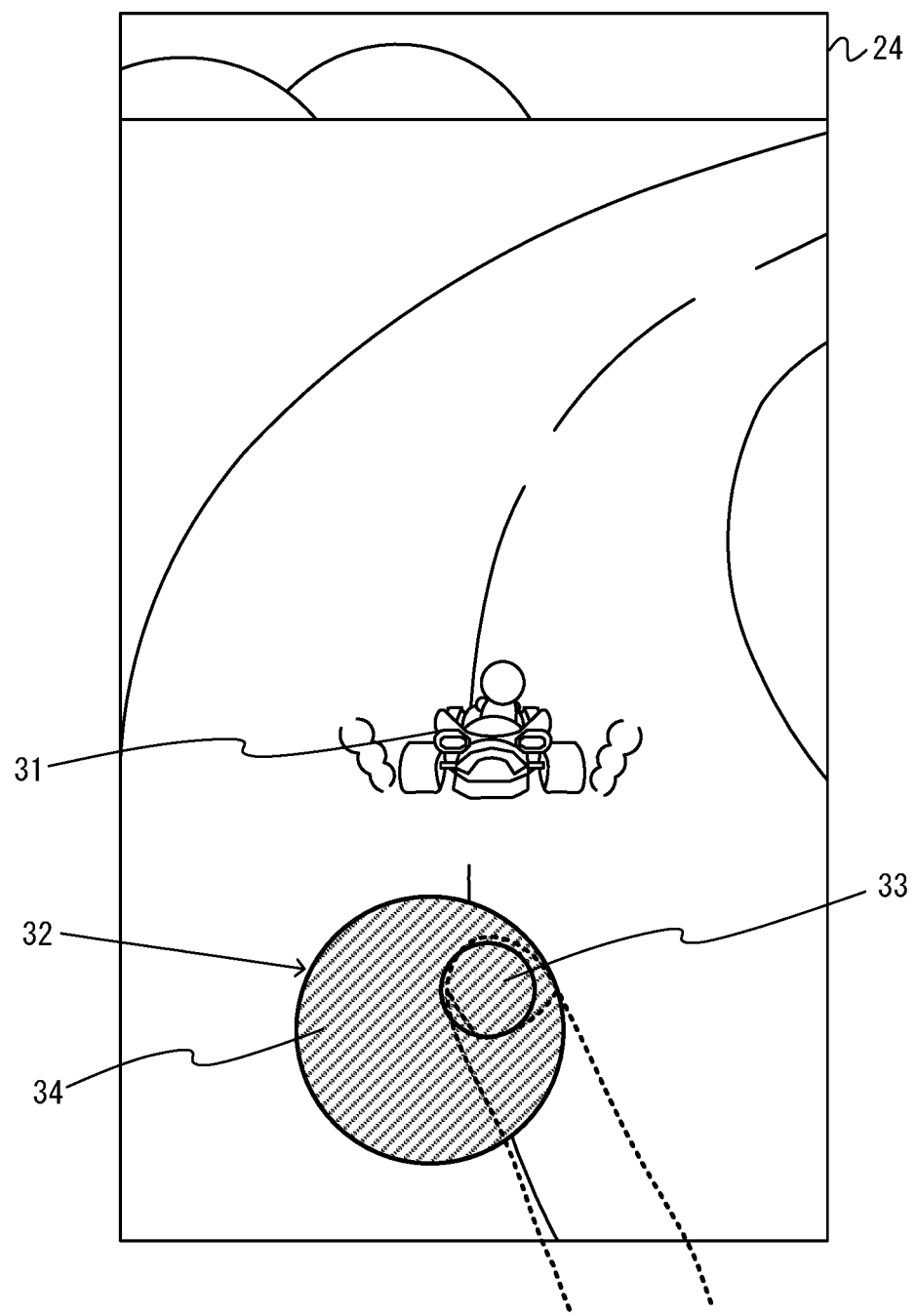
FIG. 11 shows an example of a game image including an object in a drift state.

FIG. 11 shows an example of a game image including an object in the drift state. As described above, the drift state is a state in which movement control is performed by a method different from movement control performed in the normal state. As shown in FIG. 11, in the drift state, a state in which the object 31 is drifting (specifically, a state in which smoke comes from tires) is displayed.

In the present embodiment, the operation method for the movement operation in the drift state is the same as that for the movement operation in the normal state. That is, even when the object 31 is in the drift state, the terminal device 2 specifies an input instruction (specifically, an input direction and an input distance) based on a touch input, as in the case where the object 31 is in the normal state. Thus, the user can operate the object 31 by the same operation method regardless of whether the object 31 is in the normal state or in the drift state. However, the process of controlling movement of the object 31 based on the input instruction differs between the normal state and the drift state.

In the present embodiment, in the drift state, movement of the object 31 is controlled such that the object 31 can go around a curve more sharply than in the normal state at the same speed. A specific method of movement control in the drift state is arbitrary. In another embodiment, in the drift state, movement of the object 31 may be controlled such that the object 31 can go around a curve more quickly than in the normal state. Thus, in the drift state, the terminal device 2 may perform movement control for the object 31 such that the user can perform more advantageous operation in terms of the game than in the normal state.

As described above, in the present embodiment, the terminal device 2 executes the movement process of causing the object 31 to move, based on an input position of a touch input which is a continuous touch input and is performed after a predetermined process (specifically, a transition process to the drift state) ((d) in FIG. 5). Therefore, the user can continuously perform the movement operation on the object 31 even after the transition process. Thus, operability of the movement operation on the object 31 can be improved.

The movement process in the drift state need not be executed immediately after execution of the transition process to the drift state (i.e., immediately after transition to the drift state). However, in the present embodiment, before and after execution of the transition process (i.e., before and after transition to the drift state), the terminal device 2 continuously receives movement operations (specifically, the movement operations in (b) and (d) in FIG. 5), and continuously executes movement controls based on the movement operations. Thus, the user can perform the movement operation on the object 31 without interruption even when the state of the object 31 transitions, whereby operability of the movement operation can be further improved.

The aforementioned predetermined process is not limited to the process of causing the state regarding movement of the object to transition. For example, in another embodiment, the predetermined process may be any process of causing the state of the object to transition (e.g., a process of causing the object to transition from a state where the object cannot use a certain item to a state where the object can use the item). At this time, a movement process to be performed after execution of the object state transition process may use the same movement control method as that for a movement process performed before execution of the transition process.

In the present embodiment, the movement process in the drift state is a movement process of causing a first object to move by a control method different from that for the movement process in the normal state. Therefore, the user can cause the object 31 to move by different control methods before and after the transition process, by changing the state of the object 31 (specifically, the state regarding movement) depending on the transition process. That is, in the present embodiment, the user can perform, by a continuous touch input, three types of operations including: (a) first movement operation on the object 31; (b) operation to change the control method (i.e., the transition operation); and (c) second movement operation according to a control method different from that for the first movement operation. Thus, the terminal device 2 can improve operability of the movement operation on the object 31.

Although not illustrate in FIG. 5, in the present embodiment, if the continuous touch input is ended (i.e., a touch-off is performed) while the object 31 is in the drift state, the terminal device 2 causes the object 31 to transition to the normal state. As described above, while no touch input is performed, the terminal device 2 automatically controls the object 31.

On the other hand, in the example of FIG. 5, the user continues the movement operation in the drift state ((e) in FIG. 5) to set the object 31 (in the drift state and) in an acceleration-allowed state. That is, in the present embodiment, when a predetermined acceleration condition is satisfied while the object 31 is in the drift state, the terminal device 2 sets the object 31 in the acceleration-allowed state. Although details will be described later, if the movement operation is ended (i.e., a touch-off is performed) after the object 31 has been set in the acceleration-allowed state, movement of the object 31 is controlled such that the object 31 is accelerated more than usual.

Figure 12:
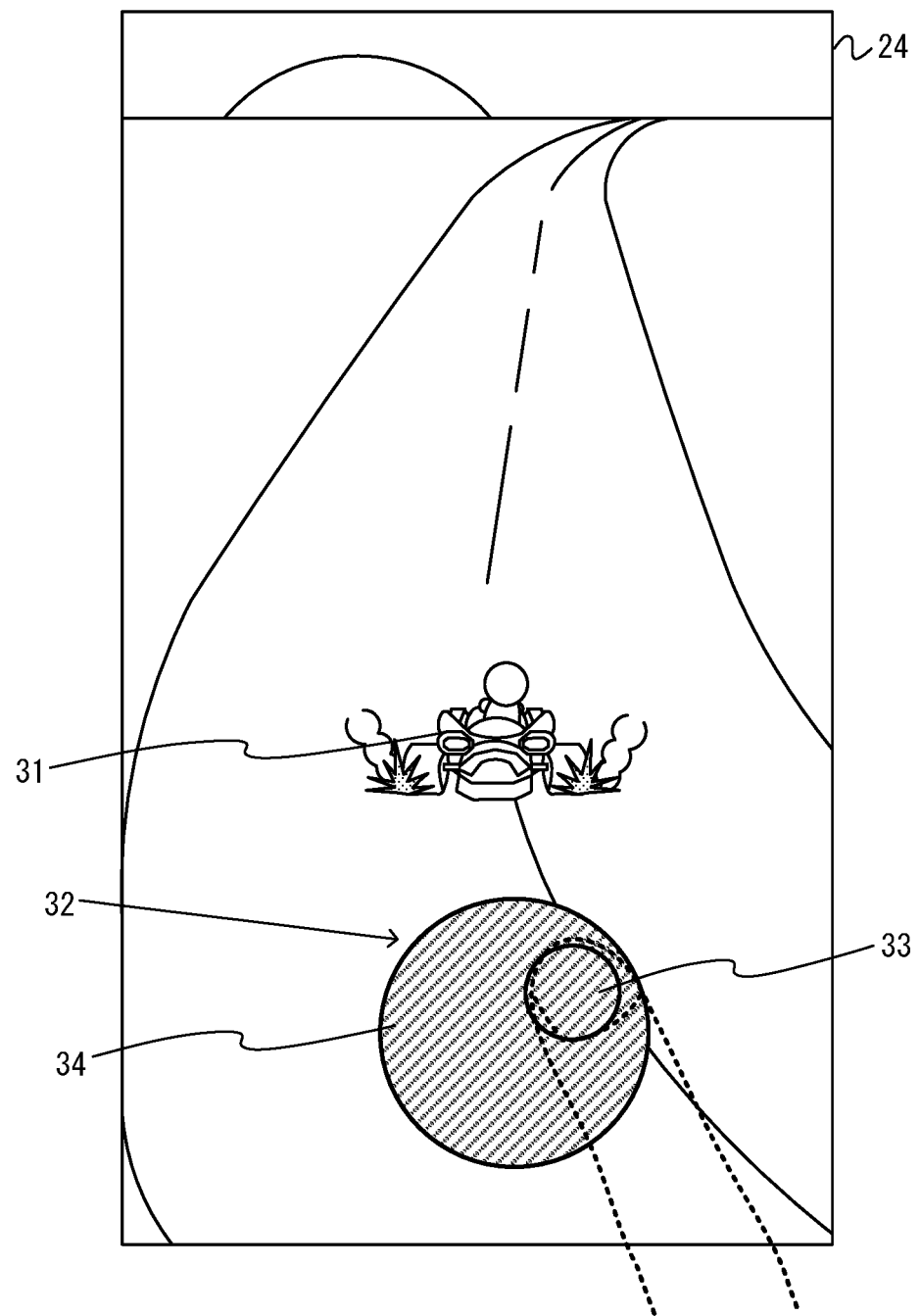
FIG. 12 shows an example of a game image including the object in an acceleration-allowed state.

FIG. 12 shows an example of a game image including an object in the acceleration-allowed state. As shown in FIG. 12, in the acceleration-allowed state, the object 31 is displayed in a display mode representing the drift state (specifically, a display mode in which smoke comes from tires) and in a display mode representing the acceleration-allowed state (specifically, a display mode in which sparks are caused from tires). In the present embodiment, the speed of the object 31 in the drift state is constant regardless of whether the object 31 is in the acceleration-allowed state. However, in another embodiment, when the object 31 in the drift state is in the acceleration-allowed state, the speed of the object 31 may be higher than that in the case where the object 31 is in the drift state but is not in the acceleration-allowed state.

In the present embodiment, the acceleration condition is that the drift state is continued for a predetermined second time period. That is, the object 31 is set in the acceleration-allowed state in response to elapse of the second time period from when the object 31 is set in the drift state. In another embodiment, the acceleration condition is arbitrary. For example, the acceleration condition may include a condition that "a continuous touch input represents a predetermined gesture in the drift state", or may include a condition that "a predetermined operation is performed by a continuous touch input in the drift state". Thus, the acceleration condition may be that an input, which satisfies a predetermined condition regarding an input direction and/or an input distance, is made, or that this state is continued for a predetermined time period.

As described above, in the present embodiment, when a touch input, which is a continuous touch input and is performed after execution of a first process (i.e., the transition process to the drift state), satisfies a predetermined condition (i.e., the acceleration condition), the terminal device 2 executes, on the object 31, a second process (i.e., a process of setting the object 31 in the acceleration-allowed state) which is different from the first process. Thus, the user causes the terminal device 2 to execute the first process and further causes the terminal device 2 to execute the second process, during the continuous touch input. That is, the terminal device 2 allows the user to perform more various game operations by the continuous touch input.

The second process may be any process regarding movement of the object 31. For example, the second process may be a process of causing the object 31 to move by a predetermined control method. Therefore, in the present embodiment, a "process of causing the object 31 to move in an accelerated state", which is described later, is also an example of the second process. At this time, the aforementioned predetermined condition is that "a continuous touch input is ended" Thus, the predetermined condition may be that "a state, in which a continuous touch input after execution of the first process satisfies a certain condition, continues for a predetermined time period", or that "a state, in which a continuous touch input after execution of the first process satisfies a certain condition, continues for a predetermined time period and then the continuous touch input after execution of the first process is ended". In another embodiment, the predetermined condition may be that "a continuous touch input after execution of the first process is ended".

In the example of FIG. 5, the user performs an acceleration operation (i.e., operation to end the touch input) after the object 31 is set in the acceleration-allowed state, thereby allowing the object 31 to travel in the accelerated state ((f) in FIG. 5). That is, if the continuous touch input is ended while the object 31 is in the acceleration-allowed state, the terminal device 2 causes the object 31 to move in the accelerated state. Here, the "accelerated state" is a state in which the object 31 moves at a higher speed than in the normal state.

Figure 13:
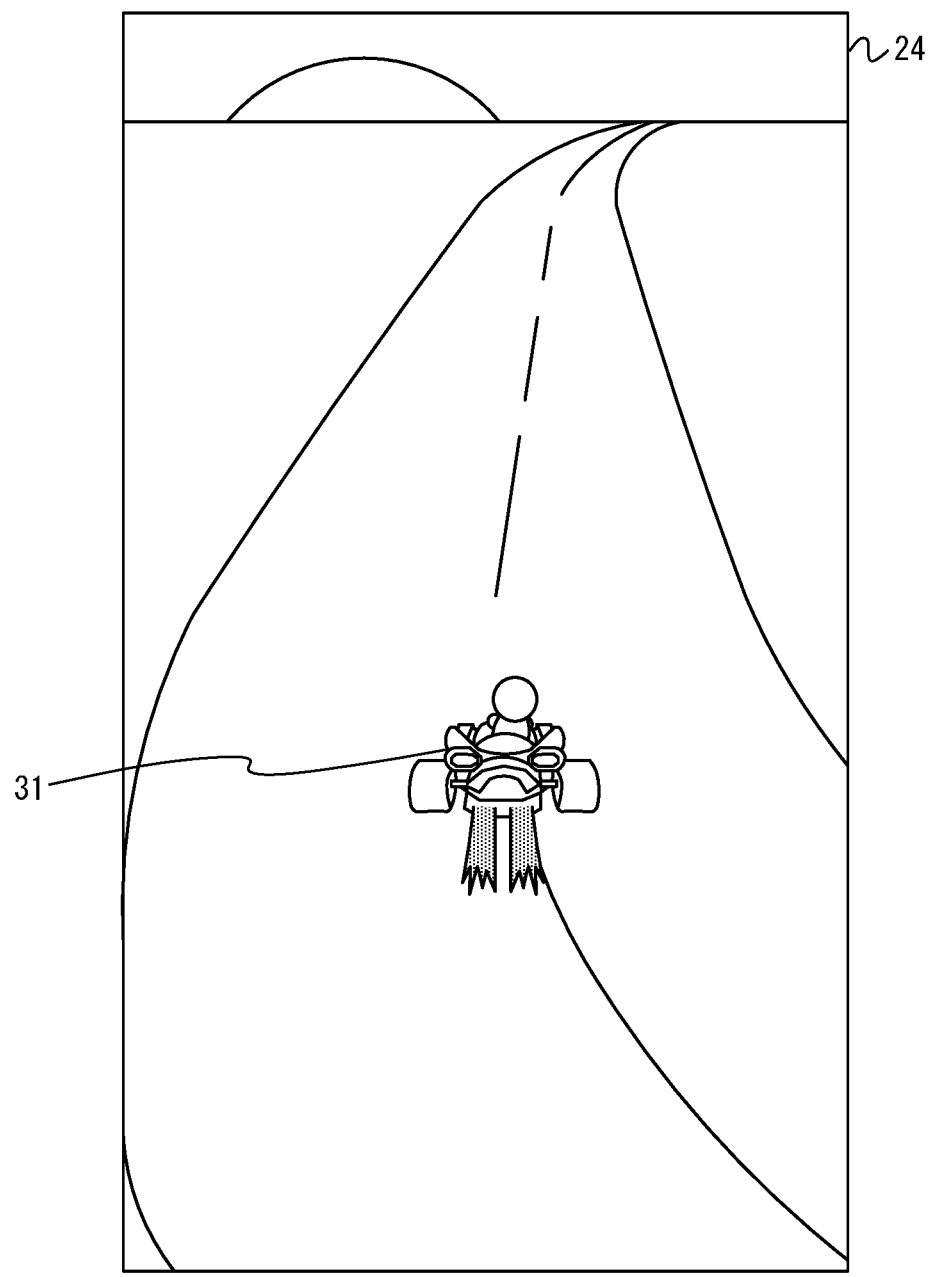
FIG. 13 shows an example of a game image including the object in an accelerated state.

FIG. 13 shows an example of a game image including an object in the accelerated state. As shown in FIG. 13, in the accelerated state, a state in which the object 31 is in the accelerated state (specifically, a state in which the object 31 jets sparks backward) is displayed.

In the present embodiment, the accelerated state is continued for a predetermined time period. That is, the terminal device 2 causes the object 31 to move in the accelerated state for the predetermined time period from a touch-off, and thereafter, performs automatic control in the normal state.

As described above, the user operates the object 31 in the drift state to be set in the acceleration-allowed state and then ends the touch input, thereby causing the object 31 to travel faster. For example, the user causes the object 31, which has transitioned to the drift state, to go around a curve of a racing course and then travel in the accelerated state from a position at which the racing course extends straight ahead, thereby causing the object 31 to travel faster.

In another embodiment, the object 31 may take multiple stages of acceleration-allowed states. For example, the object 31 may be controlled such that the object 31 is set in a first acceleration-allowed state in response to the drift state being continued for the second time period, and then the object 31 is set in a second acceleration-allowed state in response to the first acceleration-allowed state being continued for a predetermined third time period. At this time, the terminal device 2 controls the object 31 such that the accelerated state continues longer in the case where the object 31 transitions from the second acceleration-allowed state to the accelerated state (in response to a touch-off) than in the case where the object 31 transitions from the first acceleration-allowed state to the accelerated state (in response to a touch-off). In another embodiment, the terminal device 2 may control the object 31 such that the speed in the accelerated state is longer in the aforementioned case than in the case where the object 31 transitions from the first acceleration-allowed state to the accelerated state (in response to a touch-off).

Furthermore, the terminal device 2 may display the object 31 such that the multiple stages of acceleration-allowed states can be distinguished from each other. For example, the terminal device 2 may display the object 31 such that the color and/or size of sparks differs between the first acceleration-allowed state and the second acceleration-allowed state.

As described above, in the present embodiment, the user can perform the multiple types of operations (a) to (f) shown in FIG. 5 by a single touch input. Thus, in the present embodiment, the terminal device 2 allows the user to perform various game operations by using the pointing device (i.e., the touch panel).

In the present embodiment, the user can perform each of the various operations (i.e., the movement operation, the transition operation, and the acceleration operation) shown in FIG. 5 with one finger. Therefore, according to the present embodiment, the user can operate the object 31 with one finger, whereby the user can hold the terminal device 2 with one hand and perform game operations with a thumb of the hand, for example.

Although the case where the respective operations shown in FIG. 5 are performed has been described above, operations other than these operations may be realized by a touch input in the above embodiment. For example, the terminal device 2 may cause the display section 24 to display icons indicating items, and may receive a touch input designating an icon, as an operation to cause the object 31 to use an item. Furthermore, for example, the terminal device 2 may cause the object 31 to perform a predetermined action (e.g., jump) in response to a tap operation (specifically, an operation of performing a touch-off before a predetermined time period passes from a touch-on) on the touch panel 23. At this time, in order to distinguish the tap operation from the aforementioned movement operation, the terminal device 2 may receive the movement operation after the predetermined time period has passed from a touch-on.

3. Specific Example of Processing in Information Processing System

Figure 14:
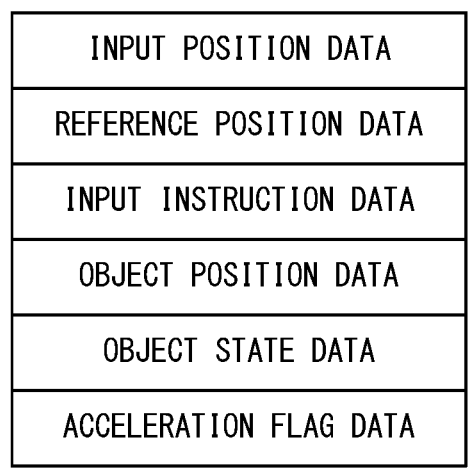
FIG. 14 shows examples of data used for game processing in a non-limiting information processing system.
Figure 15:
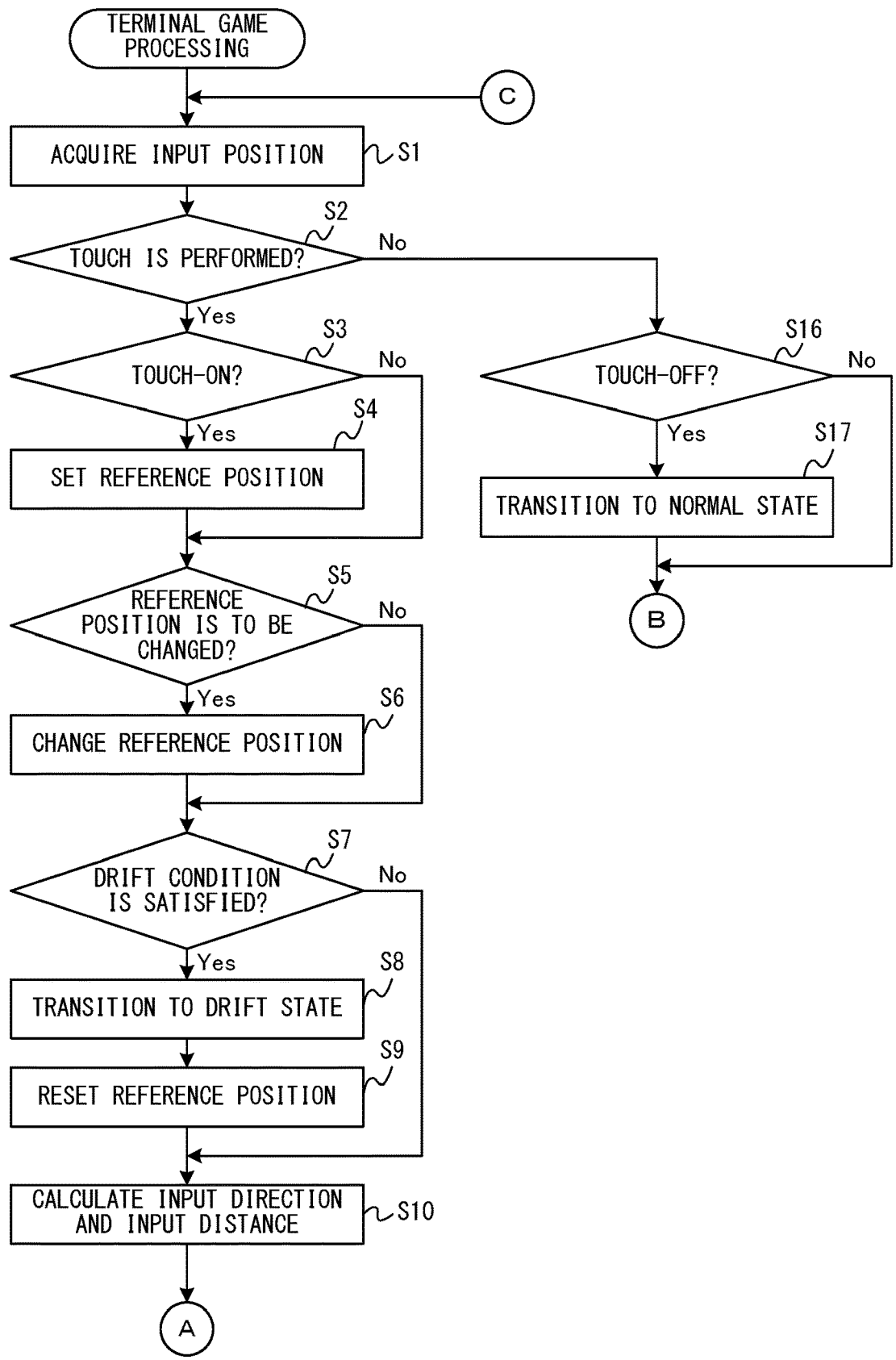
FIG. 15 is a flowchart showing an example of a flow of game processing executed by a non-limiting terminal device.
Figure 16:
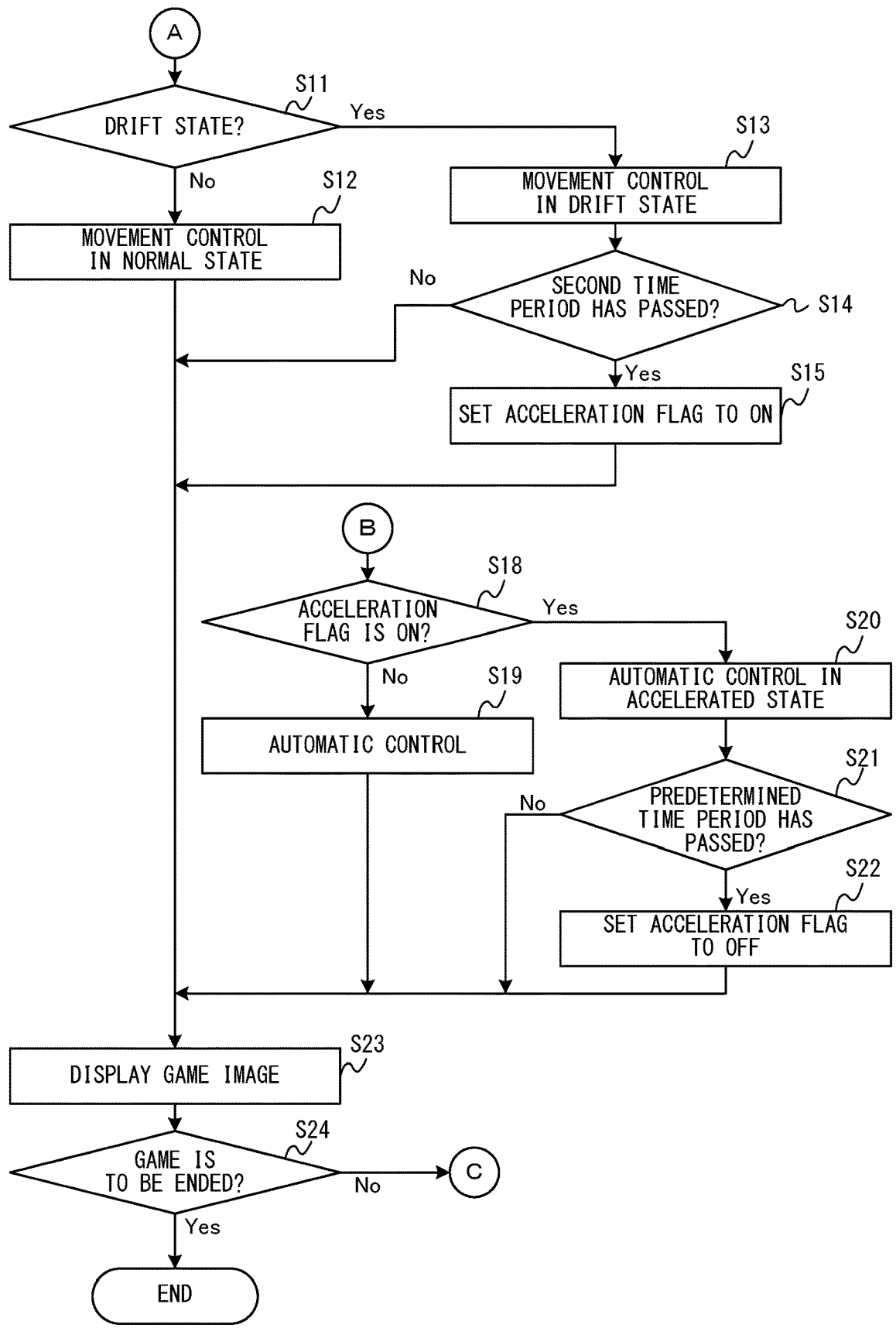
FIG. 16 is a flowchart showing an example of a flow of game processing executed by a non-limiting terminal device.

With reference to FIGS. 14 to 16, a description will be given of a specific example in the case where the game processing whose outline has been described above is executed in the information processing system.

[3-1. Data Used for Processing]

With reference to FIG. 14, specific example of data used for the game processing in the information processing system will be described. FIG. 14 shows examples of data used for the game processing in the information processing system. The data shown in FIG. 14 are stored in a storage section of the terminal device 2 (specifically, a memory of the processing section 21 and/or the storage section 22). As shown in FIG. 14, the terminal device 2 stores therein input position data, reference position data, input instruction data, object position data, object state data, and acceleration flag data.

The input position data is data indicating the aforementioned input position. In the present embodiment, the input position data includes data indicating the current input position (in other words, the latest input position), and includes data indicating previous input positions. Specifically, the input position data includes data indicating input positions, regarding a continuous touch input, which are continuously inputted from a touch-on. The content of the input position data may be reset at the time of a touch-off.

The reference position data is data indicating the aforementioned reference position. Each of the input position data and the reference position data is data of two-dimensional coordinates indicating a position on the input surface of the touch panel 23.

The input instruction data indicates the content of the aforementioned input instruction which is specified based on the input position. Specifically, the input instruction data indicates the aforementioned input direction and input distance. As described above, the input instruction data may be data indicating a numerical value in which the input direction is represented by a positive or negative sign and the input distance is represented by an absolute value.

The object position data indicates the position of the object 31 in the game space. For example, the object position data is data indicating three-dimensional or two-dimensional coordinates indicating a position in the game space.

The object state data indicates the state of the object 31. Specifically, the object state data is data indicating that the object 31 is in the normal state or the drift state. In the present embodiment, the object 31 is in the normal state when a game is started (i.e., at start of a racing game), and the object state data indicating the normal state is stored.

The acceleration flag data is data indicating an acceleration flag which represents whether or not to perform control to cause the object 31 to move in the accelerated state. Although details will be described later, when the object 31 is in the aforementioned acceleration-allowed state or accelerated state, the acceleration flag is set at ON. When the object 31 is neither in the acceleration-allowed state nor in the accelerated state, the acceleration flag is set at OFF. In the present embodiment, the acceleration flag is set to OFF when the game is started.

[3-2. Example of Game Processing]

FIGS. 15 and 16 are flowcharts showing a flow of exemplary game processing executed by the terminal device. A series of process steps shown in FIGS. 15 and 16 is started in response to start of the racing game after the game program stored in the storage section 22 is activated.

In the present embodiment, the CPU (in other words, a processor) of the processing section 21 of the terminal device 2 executes the game program (specifically, the game program for the racing game) stored in the storage section 22, thereby executing the processes in steps shown in FIGS. 15 and 16. However, in another embodiment, some of the processes in the steps may be executed by a processor (e.g., a dedicated circuit or the like) other than the CPU. Furthermore, the processes in the steps shown in FIGS. 15 and 16 are merely examples, and the processing order of the steps may be changed or other processes may be executed in addition to (or instead of) the processes in the steps, so long as similar results can be obtained.

In another embodiment, the processes in the steps shown in FIGS. 15 and 16 may be executed by cooperation of the terminal device 2 and the server 1. That is, some of the processes in the steps shown in FIGS. 15 and 16 may be executed by the server 1. At this time, the server 1 receives data to be used for the processes, from the terminal device 2 via the network 3. The server 1 transmits resultant data obtained through the processes, to the terminal device 2 via the network 3.

The processing section 21 of the terminal device executes the processes in the steps shown in FIGS. 15 and 16 by using a memory. That is, the CPU of the processing section 21 stores, in the memory, information (in other words, data) obtained in the respective process steps. When using the information in the subsequent process steps, the CPU reads out the information from the memory and uses the information.

In step S1 shown in FIG. 15, the processing section 21 acquires an input position from the touch panel 23. That is, the touch panel 23 detects an input position on the input surface thereof, and outputs detection result data indicating the detected input position. The processing section 21 acquires the detection result data from the touch panel 23, and stores input position data including the detection result data in the memory. In the present embodiment, when no touch input is performed to the touch panel 23, the touch panel 23 outputs detection result data indicating that there is no touch input. In this case, the processing section 21 acquires the detection result data indicating that there is no touch input. Next to step S1, the process in step S2 is executed.

In step S2, the processing section 21 determines whether or not a touch input is performed. The processing section 21 performs the determination in step S2, based on the input position data (in other words, the data acquired from the touch panel 23 in the process of step S1) stored in the memory. When the result of the determination in step S2 is positive, the process in step S3 is executed. When the result of the determination in step S2 is negative, the process in step S16 described later is executed.

In step S3, the processing section 21 determines whether or not the touch input is an input at the time of a touch-on. The processing section 21 performs the determination in step S3, based on the input position data stored in the memory. That is, the touch input is determined to be an input at the time of a touch-on when detection result data acquired in step S1 in the last processing loop (specifically, a processing loop of steps S1 to S24) is a value indicating that there is no touch input. On the other hand, the touch input is determined not to be an input at the time of a touch-on when the detection result data acquired in the last processing loop is a value indicating that there is a touch input. When the result of the determination in step S3 is positive, the process in step S4 is executed. When the result of the determination in step S3 is negative, the process in step S4 is skipped and the process in step S5 described later is executed.

In step S4, the processing section 21 sets a reference position. That is, the processing section 21 sets, as a reference position, the input position acquired through the process in step S1 in the current processing loop. The processing section 21 stores reference position data indicating the set reference position in the memory. Next to step S4, the process in step S5 is executed.

In step S5, the processing section 21 determines whether or not the reference position is to be changed. That is, based on the input position data and the reference position data stored in the memory, the processing section 21 performs the aforementioned determination by the method described in the section of (Reference position changing process). When the result of the determination in step S5 is positive, the process in step S6 is executed. When the result of the determination in step S5 is negative, the process in step S6 is skipped and the process in step S7 described later is executed.

In step S6, the processing section 21 changes the reference position. That is, based on the input position data and the reference position data stored in the memory, the processing section 21 calculates a post-change reference position by the method described in the section of (Reference position changing process). Furthermore, the processing section 21 updates the reference position data stored in the memory to the content indicating the calculated post-change reference position. Next to step S6, the process in step S7 is executed.

In step S7, the processing section 21 determines whether or not the drift condition is satisfied. That is, based on the input position data and the reference position data stored in the memory, the processing section 21 determines whether or not the input position satisfies the drift condition. A specific determination method in step S7 is the method described in the section of [2-3. Transition operation to drift state]. When the result of the determination in step S7 is positive, the process in step S8 is executed. When the result of the determination in step S7 is negative, the processes in steps S8 and S9 are skipped, and the process of step S10 described later is executed.

In step S8, the processing section 21 causes the state of the object 31 to transition to the drift state. That is, the processing section 21 stores the object state data indicating the drift state in the memory. Next to step S8, the process in step S9 is executed.

In step S9, the processing section 21 resets the reference position. The specific process in step S9 is the same as the process in step S6. Thus, the content of the reference position data stored in the memory is updated. Next to step S9, the process in step S10 is executed.

In step S10, the processing section 21 specifies the content of an input instruction. That is, with reference to the input position data and the reference position data stored in the memory, the processing section 21 calculates an input direction and an input distance. A specific method for calculating the input direction and the input distance is the method described in the section of [2-2. Action regarding movement operation from start of touch input]. The processing section 21 stores input instruction data indicating the calculated input direction and input distance in the memory. Next to step S10, the process in step S11 is executed.

The processes in steps S11 to S15 will be described with reference to FIG. 16. In step S11, based on the object state data stored in the memory, the processing section 21 determines whether or not the object 31 is in the drift state. When the result of the determination in step S11 is negative (i.e., when the object 31 is in the normal state), the process in step S12 is executed. When the result of the determination in step S11 is positive (i.e., when the object 31 is in the drift state), the process in step S13 is executed.

In step S12, based on the input instruction data stored in the memory, the processing section 21 performs movement control for the object 31 in the normal state. Specifically, the processing section 21 calculates a movement direction and a movement distance of the object 31 in one frame time, and calculates a post-movement position of the object 31, based on the calculated movement direction and movement distance, and the current position of the object 31. The movement control in step S12 is performed by the method described in the section of [2-2. Action regarding movement operation from start of touch input]. The processing section 21 stores, in the memory, object position data indicating the calculated post-movement position. Next to step S12, the process in step S23 described later is executed.

In step S13, the processing section 21 performs movement control for the object 31 in the drift state. Also in step S13, as in step S12, the processing section 21 calculates a post-movement position of the object 31, based on the input instruction data stored in the memory. However, the movement control in step S13 is, unlike the movement control in step S12, performed by the method described in the section of [2-4. Movement operation in drift state]. The processing section 21 stores, in the memory, object position data indicating the calculated post-movement position. Next to step S13, the process in step S14 is executed.

In step S14, the processing section 21 determines whether or not the aforementioned second time period has passed from the transition of the object 31 to the drift state. When the result of the determination in step S14 is positive, the process in step S15 is executed. When the result of the determination in step S14 is negative, the process in step S15 is skipped, and the process in step S23 described later is executed.

In step S15, the processing section 21 sets an acceleration flag to ON. That is, the processing section 21 stores, in the memory, acceleration flag data indicating that the acceleration flag is ON. Thus, the object 31 is set (in the drift state and) in the acceleration-allowed state. Next to step S15, the process in step S23 described later is executed.

Referring back to FIG. 15, the processes in steps S16 and S17 will be described. In step S16, the processing section 21 determines whether or not the touch input is ended (i.e., whether or not a touch-off is performed). The processing section 21 performs the determination in step S16 based on the input position data stored in the memory. That is, when detection result data acquired in step S1 in the last processing loop (specifically, the processing loop of steps S1 to S24) is a value indicating that there is a touch input, the processing section 21 determines that the touch input is ended. When the detection result data is a value indicating that there is no touch input, the processing section 21 determines that the touch input is not ended yet. When the result of the determination in step S16 is positive, the process in step S17 is executed. When the result of the determination in step S16 is negative, the process in step S17 is skipped, and the process in step S18 described later is executed.

In step S17, the processing section 21 causes the state of the object 31 to transition to the normal state. That is, the processing section 21 stores object state data indicating the normal state in the memory. Next to step S17, the process in step S18 is executed.

Referring back to FIG. 16, the processes in steps S18 to S24 will be described. In step S18, based on the acceleration flag data stored in the memory, the processing section 21 determines whether or not the acceleration flag is set at ON. When the result of the determination in step S18 is negative (i.e., when the acceleration flag is set at OFF), the process in step S19 is executed. When the result of the determination in step S18 is positive (i.e., when the acceleration flag is set at ON), the process in step S20 described later is executed.

In step S19, the processing section 21 performs automatic control for the object 31. That is, the processing section 21 calculates a post-movement position of the object 31, by controlling movement of the object 31 in accordance with an algorism that is predetermined in a program of a game application stored in the storage section 12. The processing section 21 stores, in the memory, object position data indicating the calculated post-movement position. Next to step S19, the process in step S23 described later is executed.

On the other hand, in step S20, the processing section 21 performs automatic control for the object 31 in the accelerated state. Also in step S20, as in step S19, the processing section 21 calculates a post-movement position of the object 31, by controlling movement of the object 31 in accordance with an algorism that is predetermined in the program of the game application. However, in step S20, the post-movement position of the object 31 is calculated such that the object 31 moves at a speed higher than a movement speed set in step S19. The processing section 21 stores, in the memory, object position data indicating the calculated post-movement position. Next to step S20, the process in step S21 is executed.

In step S21, the processing section 21 determines whether or not the aforementioned predetermined time period has passed from start of the movement control for the object 31 in the accelerated state (in other words, from when a touch-off is performed). When the result of the determination in step S21 is positive, the process in step S22 is executed. When the result of the determination in step S21 is negative, the process in step S22 is skipped, and the process in step S23 described later is executed.

In step S22, the processing section 21 sets the acceleration flag to OFF. That is, the processing section 21 stores, in the memory, acceleration flag data indicating that the acceleration flag is OFF. Thus, the object 31 is set (in the normal state and) in the accelerated state. Next to step S22, the process in step S23 is executed.

In step S23, the processing section 21 generates a game image, and causes the display section 24 to display the game image. That is, the processing section 21 generates the game image based on the object position data stored in the memory, and causes the display section 24 to display the generated game image. The game image generated in step S23 represents a game space in which the object 31 is located at a position indicated by the object position data. In the process in step S23, the processing section 21 controls actions of other objects (e.g., other characters and/or items) according to need, and generates a game image representing a game space including these objects. Next to step S23, the process in step S24 is executed.

In step S24, the processing section 21 determines whether or not to end the game. That is, the processing section 21 ends the game when a predetermined game end condition is satisfied (e.g., the object operated by the user crosses a finish line), or when a predetermined game end instruction is made by the user. The processing section 21 determines not to end the game, when the game end condition is not satisfied and no predetermined termination instruction is made by the user. When the result of the determination in step S24 is negative, the process in step S1 is executed. The processing section 21 repeats the series of processes in steps S1 to S24 until determining to end the game in step S24. When the result of the determination in step S24 is positive, the processing section 21 ends the game processing shown in FIGS. 15 and 16.

4. Function and Effect of Present Embodiment, and Modifications

According to the above-described embodiment, a game program causes an information processing apparatus (e.g., the terminal device 2) having a pointing device (e.g., the touch panel 23) to execute process steps as follows:

a first movement process step (S12) of executing a first movement process for causing an object to move in a virtual game space, based on a reference position, and an input position of an input (i.e., continuous touch input) which is continuously performed from start of the input onto the pointing device; and a first process execution step (S8 or S13) of executing a first process on the object, when the input position of the input, which is continuously performed from start of the input onto the pointing device, satisfies a predetermined first condition (i.e., drift condition) regarding the relationship between the input position and the reference position.

According to the above embodiment, the user can perform a movement operation on the object by the input continued from the start thereof, and furthermore can execute the first process on the object by the continued input. Therefore, the information processing apparatus allows the user to perform various operations by the simple input method. Specifically, according to the above embodiment, the user is allowed to perform multiple types of operations on the object by the touch input continued from the start thereof.

When executing the first movement process step and the first process execution step, the information processing apparatus may not execute a reference position resetting step described later. Also in this case, the information processing apparatus achieves the aforementioned effects.

The "input which is continuously performed from start of the input to the pointing device" is not required to be an input being continued in a strict sense. For example, as for the aforementioned "continuous touch input", a situation can be considered in which, although a touch input is actually performed on the touch panel 23, the touch input is not temporarily detected for a predetermined time period due to erroneous detection. In this case, the terminal device 2 may deal with a touch input detected before the predetermined time period and a touch input detected after the predetermined time period, collectively, as a single continuous touch input. Specifically, when a time period from when a certain touch input has become undetected to when a next touch input is detected is shorter than a predetermined time length, the terminal device 2 may deal with the certain touch input and the next touch input collectively as a single continuous touch input.

In the above-described embodiment, the first process can be regarded as a process (step S8) for changing the state of the object 31 (more specifically, the state regarding movement of the object 31). Furthermore, in the above-described embodiment, the first process can be regarded as a process different from the first movement process (i.e., the movement control process in the normal state (S12)) and as a process of controlling action of the object 31 (i.e., the movement control process in the drift state (S13)). In another embodiment, the "process of controlling action of an object" is not limited to a process of causing the object to move, and may be, for example, a process of causing the object to perform a predetermined action (e.g., an action of jump or attack).

In another embodiment, the first object to be subjected to the first movement process and the second object to be subjected to the first process may be different objects. For example, in the other embodiment, the first object may be an object of a character having a gun, and the second object may be an object of a bullet shot from the gun. At this time, the information processing apparatus may cause the character to move by the first movement process, and when the first condition is satisfied, may execute, as the first process, a process of causing the bullet to be shot (in other words, a process of causing the bullet to move).

In the above embodiment, the first process is executed in response to the first condition being satisfied after start of the first movement process. In another embodiment, the first movement process may be executed in the case where a second condition regarding the relationship between a reference position and an input position of an input which is continuously performed from start of the input onto the pointing device (however, the second condition is different from the first condition) is satisfied. The second condition is, for example, that the input distance exceeds the aforementioned control start distance. The first condition is stricter than the second condition (that is, the first condition is satisfied only after the second condition is satisfied). For example, the control start distance is set to a value smaller than the predetermined value in the aforementioned (condition b).

According to the above embodiment, a game program causes a computer of an information processing apparatus (e.g., the terminal device 2) having a pointing device (e.g., the touch panel 23) to execute process steps as follows:

a movement process step (S12) of executing a movement process for causing an object to move in a virtual game space, based on a reference position, and an input position of an input (i.e., continuous touch input) which is continuously performed from start of the input onto the pointing device;

a reference position resetting step (S9) of, when the input position of the input, which is continuously performed from start of the input onto the pointing device, satisfies a predetermined condition (i.e., drift condition), resetting the reference position to the input position at which the condition is satisfied.

According to the above configuration, the user can perform the movement operation on the object and the process of resetting the reference position, by an input which is continuously performed. Thus, the user is allowed to perform various operations by using the pointing device. Furthermore, since the user can reset the reference position while continuing the input, the user can reset the reference position through a simple operation without the necessity of performing an input again. Thus, operability of the movement operation can be improved. More specifically, according to the above embodiment, since the reference position is reset in response to transition to the drift state, the reference position is set at an appropriate position when the object is set in the drift state, which allows the user to easily perform instructions regarding right and left directions.

When executing the movement process step and the reference position resetting step, the information processing apparatus may not execute the first process execution step. Also in this case, the information processing apparatus achieves the aforementioned effects.

In the above embodiment, the predetermined condition for resetting the reference position is the same as the drift condition. In another embodiment, the predetermined condition need not be the same as the drift condition. For example, in the other embodiment, the terminal device 2 resets the reference position in response to the predetermined condition being satisfied, while the terminal device 2 need not cause the object 31 to transition to the drift state in response to the predetermined condition being satisfied.

(Modification Regarding Game Content)

In another embodiment, the content of the game executed in the terminal device 2 is not limited to racing, and a game of any content may be executed. For example, in the other embodiment, the game executed in the terminal device 2 may be a game in which an object (i.e., a player character) in an action game is operated by an input to the pointing device. That is, the terminal device 2 may perform movement control to cause the object to move by walking in the movement process in step S12, and cause the object to move by running in the movement process in step S13. At this time, the terminal device 2 manages the state (i.e., walking or running) regarding the movement method of the object, and causes the state of the object to transition from the walking state to the running state in step S8. Furthermore, the terminal device 2 may perform, in the process of step S20, movement control to cause the object to run at a speed higher than the speed in the movement process of step S13.

For the purpose of, for example, achieving various game operations by using a pointing device, it is possible to use the above embodiment as a game program, a game apparatus, and the like.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium storing a game program to be executed on a computer of an information processing device, the game program, when executed by the computer, causing the computer to:

repeatedly acquire input positions detected by a pointing device;

set a reference position, based on an input position at which a movement operation input to the pointing device is started;

cause an object to move in a virtual game space by a first movement process, based on the reference position and on the input position of the input which is continuously performed from start of the movement operation input; and cause the object to move in the virtual game space by a second movement process different from the first movement process, in a case where the input position of the input, which is continuously performed from start of the movement operation input, satisfies a first condition regarding a relationship between the input position and the reference position, in the first movement process and the second movement process, a movement direction of the object is changed in the virtual game space, based on a distance between the reference position and the input position, and an amount of change, in the movement direction of the object in the first movement process, which is obtained when the distance is a certain value, is different from an amount of change, in the movement direction of the object in the second movement process, which is obtained when the distance is the certain value.

2. The non-transitory computer-readable storage medium according to claim 1, wherein the amount of change, in the movement direction of the object in the second movement process, which is obtained when the distance is the certain value, is greater than the amount of change, in the movement direction of the object in the first movement process, which is obtained when the distance is the certain value.

3. A non-transitory computer-readable storage medium storing a game program to be executed on a computer of an information processing device, the game program, when executed by the computer, causing the computer to:

repeatedly acquire input positions detected by a pointing device;

set a reference position, based on an input position at which a movement operation input to the pointing device is started;

cause an object to move in a virtual game space by a first movement process, based on the reference position and on the input position of the input which is continuously performed from start of the movement operation input; and cause the object to move in the virtual game space by a second movement process different from the first movement process, in a case where the input position of the input, which is continuously performed from start of the movement operation input, satisfies a first condition regarding a relationship between the input position and the reference position, wherein in a case where the object is caused to move in the second movement process in response to the first condition being satisfied, the object is caused to continuously move in the second movement process after the first condition has become unsatisfied.

4. The non-transitory computer-readable storage medium according to claim 1, wherein the game program further causes the computer to execute an action control process for the object, in a case where an input, which is continuously performed from start of the movement operation input and which is performed after the first condition is satisfied, satisfies a second condition.

5. The non-transitory computer-readable storage medium according to claim 4, wherein a process regarding movement of the object is executed as the action control process.

6. The non-transitory computer-readable storage medium according to claim 4, wherein the action control process is executed in response to end of the input which is continuously performed from start of the movement operation input.

7. The non-transitory computer-readable storage medium according to claim 1, wherein the first condition includes a condition that a state, in which the input position of the input continuously performed from start of the movement operation input satisfies a predetermined condition, is continued for a predetermined time period.

8. The non-transitory computer-readable storage medium according to claim 1, wherein
the second movement process is executed in response to the first condition being satisfied after start of the first movement process.

9. An information processing apparatus comprising:
a memory for storing instructions; and
one or more processors in communication with the memory, wherein the instructions, when executed, configure the one or more processors to:
repeatedly acquire input positions detected by a pointing device;
set a reference position, based on an input position at which a movement operation input is started;
cause an object to move in a virtual game space by a first movement process, based on the reference position and on the input position of the input which is continuously performed from start of the movement operation input; and
cause the object to move by a second movement process different from the first movement process, in a case where the input position of the input, which is continuously performed from start of the movement control input, satisfies a first condition regarding a relationship between the input position and the reference position,
in the first movement process and the second movement process, a movement direction of the object is changed in the virtual game space, based on a distance between the reference position and the input position, and
an amount of change in the movement direction of the object in the first movement process, which is obtained when the distance is a certain value, is different from an amount of change, in the movement direction of the object in the second movement process, which is obtained when the distance is the certain value.

10. An information processing system comprising:
a memory for storing instructions; and
one or more processors in communication with the memory, wherein the instructions, when executed, configure the one or more processors to:
acquire input positions detected by a pointing device;
set a reference position, based on an input position at which a movement operation input to the pointing device is started;
cause the object to move in a virtual game space by a first movement process, based on the reference position and on the input position of the input which is continuously performed from start of the movement operation input; and
cause the object to move in the virtual game space by a second movement process different from the first movement process, in a case where the input position of the input, which is continuously performed from start of the movement operation input, satisfies a first condition regarding a relationship between the input position and the reference position,
in the first movement process and the second movement process, a movement direction of the object is changed in the virtual game space, based on a distance between the reference position and the input position, and
an amount of change, in the movement direction of the object in the first movement process, which is obtained when the distance is a certain value, is different from an amount of change, in the movement direction of the object in the second movement process, which is obtained when the distance is the certain value.

11. A game processing method executed in an information processing system, the method comprising:
repeatedly acquiring input positions detected by a pointing device;
setting a reference position, based on an input position at which a movement operation input to the pointing device is started;
causing an object to move in a virtual game space by a first movement process, based on the reference position and on the input position of the input which is continuously performed from start of the movement operation input; and
causing the object to move in a second movement process different from the first movement process, in a case where the input position of the input, which is continuously performed from start of the movement operation input, satisfies a first condition regarding a relationship between the input position and the reference position,
in the first movement process and the second movement process, a movement direction of the object is changed in the virtual game space, based on a distance between the reference position and the input position, and
an amount of change, in the movement direction of the object in the first movement process, which is obtained when the distance is a certain value, is different from an amount of change, in the movement direction of the object in the second movement process, which is obtained when the distance is the certain value.

12. An information processing apparatus comprising:
at least one hardware processor configured to:
repeatedly acquire input positions detected by a pointing device;
set a reference position, based on an input position at which a movement operation input to the pointing device is started;
cause an object to move in a virtual game space by a first movement process, based on the reference position and on the input position of the input which is continuously performed from start of the movement operation input; and
cause the object to move in the virtual game space by a second movement process different from the first movement process, in a case where the input position of the input, which is continuously performed from start of the movement operation input, satisfies a first condition regarding a relationship between the input position and the reference position,
wherein in a case where the object is caused to move in the second movement process in response to the first condition being satisfied, the object is caused to continuously move in the second movement process after the first condition has become unsatisfied.

13. An information processing system comprising:
a processing system that includes computer executable instructions that, when executed by at least one hardware processor of the processing system, are configured to cause the at least one hardware processor to perform operations comprising:
repeatedly acquiring input positions detected by a pointing device;
setting a reference position, based on an input position at which a movement operation input to the pointing device is started;
causing an object to move in a virtual game space by a first movement process, based on the reference position and on the input position of the input which is continuously performed from start of the movement operation input; and causing the object to move in the virtual game space by a second movement process different from the first movement process, in a case where the input position of the input, which is continuously performed from start of the movement operation input, satisfies a first condition regarding a relationship between the input position and the reference position, wherein in a case where the object is caused to move in the second movement process in response to the first condition being satisfied, the object is caused to continuously move in the second movement process after the first condition has become unsatisfied.

14. A method executed by an information processing system that includes at least one hardware processor, the method comprising:

repeatedly acquiring input positions detected by a pointing device;

setting a reference position, based on an input position at which a movement operation input to the pointing device is started;

causing an object to move in a virtual game space by a first movement process, based on the reference position and on the input position of the input which is continuously performed from start of the movement operation input; and causing the object to move in the virtual game space by a second movement process different from the first movement process, in a case where the input position of the input, which is continuously performed from start of the movement operation input, satisfies a first condition regarding a relationship between the input position and the reference position, wherein in a case where the object is caused to move in the second movement process in response to the first condition being satisfied, the object is caused to continuously move in the second movement process after the first condition has become unsatisfied.

* * * * *